US011832161B2

(12) United States Patent
Miyamoto et al.

(10) Patent No.: US 11,832,161 B2
(45) Date of Patent: Nov. 28, 2023

(54) INFORMATION PROCESSING APPARATUS CAPABLE OF MAKING CORRECT SETTINGS FOR WIRELESS COMMUNICATION, WIRELESS COMMUNICATION MODULE, METHOD OF CONTROLLING INFORMATION PROCESSING APPARATUS, AND STORAGE MEDIUM

(71) Applicant: CANON KABUSHIKI KAISHA, Tokyo (JP)

(72) Inventors: Takayuki Miyamoto, Chiba (JP); Kozo Toda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 17/590,107

(22) Filed: Feb. 1, 2022

(65) Prior Publication Data
US 2022/0248303 A1    Aug. 4, 2022

(30) Foreign Application Priority Data

Feb. 4, 2021   (JP) .................................. 2021-016697
Nov. 19, 2021  (JP) .................................. 2021-188688

(51) Int. Cl.
H04W 48/04    (2009.01)
H04W 8/18     (2009.01)
H04W 12/06    (2021.01)
H04W 8/26     (2009.01)
H04W 84/12    (2009.01)

(52) U.S. Cl.
CPC .......... H04W 48/04 (2013.01); H04W 8/186 (2013.01); H04W 8/26 (2013.01); H04W 12/068 (2021.01); H04W 84/12 (2013.01)

(58) Field of Classification Search
CPC ..... H04W 48/04; H04W 12/068; H04W 8/26; H04W 84/12
USPC ................ 370/329, 328, 338, 341, 345, 350
See application file for complete search history.

(56) References Cited

U.S. PATENT DOCUMENTS

2010/0279615 A1* 11/2010 Sugaya ................... H04L 69/22
455/62

FOREIGN PATENT DOCUMENTS

JP    2008236081 A    10/2008

* cited by examiner

Primary Examiner — Nghi H Ly
(74) Attorney, Agent, or Firm — ROSSI, KIMMS & McDOWELL LLP

(57) ABSTRACT

An information processing apparatus that is capable of making correct settings for wireless communication of which standards are different depending on the country, in conformity to the standards of a country where the information processing apparatus is used. On an image forming apparatus as the information processing apparatus, a wireless LAN module can be mounted which can be used in a plurality of specific countries and stores a country destination group number indicative of the plurality of specific countries in an OTP section. The image forming apparatus acquires the country destination group number as the group identification information from the OTP section of the mounted wireless LAN module. A control unit makes settings for enabling wireless communication using the mounted wireless LAN module, by using setting information on the acquired country destination group number.

7 Claims, 16 Drawing Sheets

*FIG. 5*
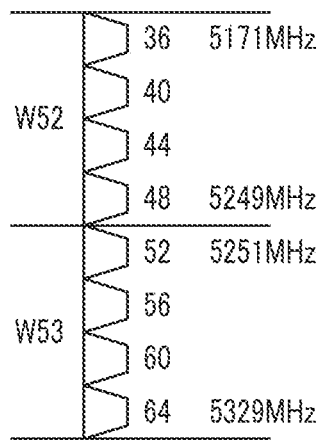
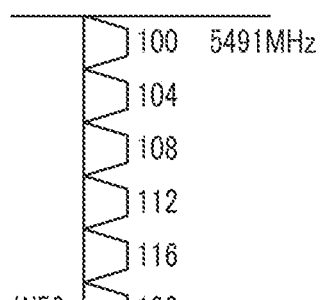
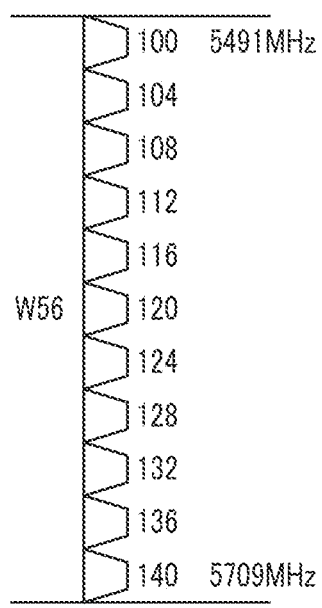
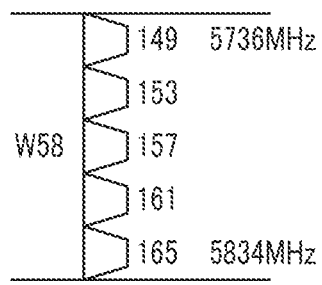

FIG. 6A

| FREQUENCY CHANNEL | W52 | | | | W53 | | | | W56 | | | | | | | | | | | W58 | | | | |
|---|---|---|---|---|---|---|---|---|---|---|---|---|---|---|---|---|---|---|---|---|---|---|---|---|
| | 36 | 40 | 44 | 48 | 52 | 56 | 60 | 64 | 100 | 104 | 108 | 112 | 116 | 120 | 124 | 128 | 132 | 136 | 140 | 149 | 153 | 157 | 161 | 165 |
| USA | O | O | O | O | O | O | O | O | x | x | x | x | x | x | x | x | x | x | x | O | O | O | O | O |
| CANADA | O | O | O | O | O | O | O | O | O | O | O | O | O | O | O | O | O | O | O | O | O | O | O | O |
| MALAYSIA | O | O | O | O | O | O | O | O | x | O | x | x | x | x | x | x | x | x | x | O | O | O | O | O |
| MEXICO | O | O | O | O | O | O | O | O | x | x | x | x | x | x | x | x | x | x | x | O | O | O | O | O |
| BRAZIL | O | O | O | O | O | O | O | O | O | O | O | O | O | O | O | O | O | O | O | O | O | O | O | O |

COUNTRY DESTINATION GROUP 001

| COUNTRY DESTINATION GROUP NUMBER: 001 | W52 | | | | W53 | | | | W56 | | | | | | | | | | | W58 | | | | |
|---|---|---|---|---|---|---|---|---|---|---|---|---|---|---|---|---|---|---|---|---|---|---|---|---|
| FREQUENCY CHANNEL | 36 | 40 | 44 | 48 | 52 | 56 | 60 | 64 | 100 | 104 | 108 | 112 | 116 | 120 | 124 | 128 | 132 | 136 | 140 | 149 | 153 | 157 | 161 | 165 |
| AVAILABILITY | O | O | O | O | O | O | O | O | x | x | x | x | x | x | x | x | x | x | x | O | O | O | O | O |

FIG. 6B

| FREQUENCY CHANNEL | W52 | | | | W53 | | | | W56 | | | | | | | | | | | W58 | | | | |
|---|---|---|---|---|---|---|---|---|---|---|---|---|---|---|---|---|---|---|---|---|---|---|---|---|
| | 36 | 40 | 44 | 48 | 52 | 56 | 60 | 64 | 100 | 104 | 108 | 112 | 116 | 120 | 124 | 128 | 132 | 136 | 140 | 149 | 153 | 157 | 161 | 165 |
| JAPAN | O | O | O | O | O | O | O | O | O | O | O | O | O | O | O | O | O | O | O | x | x | x | x | x |
| EU | O | O | O | O | O | O | O | O | O | O | O | O | O | O | O | O | O | O | O | x | x | x | x | x |
| SAUDI ARABIA | O | O | O | O | O | O | O | O | O | O | O | O | O | O | O | O | O | O | O | O | O | O | O | O |

COUNTRY DESTINATION GROUP 002

| COUNTRY DESTINATION GROUP NUMBER: 002 | W52 | | | | W53 | | | | W56 | | | | | | | | | | | W58 | | | | |
|---|---|---|---|---|---|---|---|---|---|---|---|---|---|---|---|---|---|---|---|---|---|---|---|---|
| FREQUENCY CHANNEL | 36 | 40 | 44 | 48 | 52 | 56 | 60 | 64 | 100 | 104 | 108 | 112 | 116 | 120 | 124 | 128 | 132 | 136 | 140 | 149 | 153 | 157 | 161 | 165 |
| AVAILABILITY | O | O | O | O | O | O | O | O | O | O | O | O | O | O | O | O | O | O | O | x | x | x | x | x |

FIG. 6C

| FREQUENCY CHANNEL | 5GHz | | | | | | | | | | | | | | | | | | | | | | | | | |
|---|---|---|---|---|---|---|---|---|---|---|---|---|---|---|---|---|---|---|---|---|---|---|---|---|---|---|
| | W52 | | | | W53 | | | | W56 | | | | | | | | | | W58 | | | | | | |
| | 36 | 40 | 44 | 48 | 52 | 56 | 60 | 64 | 100 | 104 | 108 | 112 | 116 | 120 | 124 | 128 | 132 | 136 | 140 | 149 | 153 | 157 | 161 | 165 |
| INDIA | ○ | ○ | ○ | ○ | ○ | ○ | ○ | ○ | × | × | × | × | × | × | × | × | × | × | × | ○ | ○ | ○ | ○ | ○ |
| CHINA | ○ | ○ | ○ | ○ | ○ | ○ | ○ | ○ | × | × | × | × | × | × | × | × | × | × | × | ○ | ○ | ○ | ○ | ○ |
| KOREA | ○ | ○ | ○ | ○ | ○ | ○ | ○ | ○ | ○ | ○ | ○ | ○ | ○ | ○ | ○ | × | × | × | × | ○ | ○ | ○ | ○ | × |

COUNTRY DESTINATION GROUP 003

| COUNTRY DESTINATION GROUP NUMBER:003 | 5GHz | | | | | | | | | | | | | | | | | | | | | | | |
|---|---|---|---|---|---|---|---|---|---|---|---|---|---|---|---|---|---|---|---|---|---|---|---|---|
| | W52 | | | | W53 | | | | W56 | | | | | | | | | | W58 | | | | | |
| FREQUENCY CHANNEL | 36 | 40 | 44 | 48 | 52 | 56 | 60 | 64 | 100 | 104 | 108 | 112 | 116 | 120 | 124 | 128 | 132 | 136 | 140 | 149 | 153 | 157 | 161 | 165 |
| AVAILABILITY | ○ | ○ | ○ | ○ | ○ | ○ | ○ | ○ | × | × | × | × | × | × | × | × | × | × | × | ○ | ○ | ○ | ○ | × |

| FREQUENCY CHANNEL | 5GHz | | | | | | | | | | | | | | | | | | | | | | | | |
|---|---|---|---|---|---|---|---|---|---|---|---|---|---|---|---|---|---|---|---|---|---|---|---|---|
| | W52 | | | | W53 | | | | W56 | | | | | | | | | | W58 | | | | | |
| | 36 | 40 | 44 | 48 | 52 | 56 | 60 | 64 | 100 | 104 | 108 | 112 | 116 | 120 | 124 | 128 | 132 | 136 | 140 | 149 | 153 | 157 | 161 | 165 |
| COUNTRY DESTINATION GROUP NUMBER | | | | | | | | | | | | | | | | | | | | | | | | |
| 001 | ○ | ○ | ○ | ○ | ○ | ○ | ○ | ○ | × | × | × | × | × | × | × | × | × | × | × | ○ | ○ | ○ | ○ |  |
| 002 | ○ | ○ | ○ | ○ | ○ | ○ | ○ | ○ | ○ | ○ | ○ | ○ | ○ | ○ | ○ | ○ | ○ | ○ | ○ | ○ | × | × |  |  |
| 003 | ○ | ○ | ○ | ○ | ○ | ○ | ○ | ○ | × | × | × | × | × | × | × | × | × | × | × | ○ | ○ | ○ | ○ | × |
| ...... | | | | | | | | | | | | | | | | | | | | | | | | |

FIG. 11A

| FREQUENCY CHANNEL | 5GHz | | | | | | | | | | | | | | | | | | | | | | | | 2.4GHz | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|
| | W52 | | | | W53 | | | | W56 | | | | | | | | | | W58 | | | | | | | | | | | | | | | | | | | |
| | 36 | 40 | 44 | 48 | 52 | 56 | 60 | 64 | 100 | 104 | 108 | 112 | 116 | 120 | 124 | 128 | 132 | 136 | 140 | 149 | 153 | 157 | 161 | 165 | 1 | 2 | 3 | 4 | 5 | 6 | 7 | 8 | 9 | 10 | 11 | 12 | 13 |
| SINGAPORE | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ |
| MALAYSIA | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ |
| PAKISTAN | × | × | × | × | × | × | × | × | × | × | × | × | × | × | × | × | × | × | × | ○ | ○ | ○ | ○ | ○ | ○ | ○ | ○ | ○ | ○ | ○ | ○ | ○ | ○ | ○ | ○ | ○ | ○ |
| BANGLADESH | × | × | × | × | × | × | × | × | × | × | × | × | × | × | × | × | × | × | × | ○ | ○ | ○ | ○ | ○ | ○ | ○ | ○ | ○ | ○ | ○ | ○ | ○ | ○ | ○ | ○ | | |
| ... | | | | | | | | | | | | | | | | | | | | | | | | | | | | | | | | | | | | | |

FIG. 11B

| FREQUENCY CHANNEL | 5GHz | | | | | | | | | | | | | | | | | | | | | | | | 2.4GHz | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|
| | W52 | | | | W53 | | | | W56 | | | | | | | | | | W58 | | | | | | | | | | | | | | | | | | | |
| | 36 | 40 | 44 | 48 | 52 | 56 | 60 | 64 | 100 | 104 | 108 | 112 | 116 | 120 | 124 | 128 | 132 | 136 | 140 | 149 | 153 | 157 | 161 | 165 | 1 | 2 | 3 | 4 | 5 | 6 | 7 | 8 | 9 | 10 | 11 | 12 | 13 |
| ASIA 230V | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ |

| COUNTRY NAME | 5 GHz BAND AVAILABILITY/ UNAVAILABILITY INFORMATION |
|---|---|
| SINGAPORE | AVAILABLE |
| MALAYSIA | AVAILABLE |
| PAKISTAN | UNAVAILABLE |
| BANGLADESH | UNAVAILABLE |

INFORMATION PROCESSING APPARATUS CAPABLE OF MAKING CORRECT SETTINGS FOR WIRELESS COMMUNICATION, WIRELESS COMMUNICATION MODULE, METHOD OF CONTROLLING INFORMATION PROCESSING APPARATUS, AND STORAGE MEDIUM

BACKGROUND OF THE INVENTION

Field of the Invention

The present invention relates to an information processing apparatus, a wireless communication module, a method of controlling the information processing apparatus, and a storage medium.

Description of the Related Art

As an information processing apparatus, such as an image forming apparatus, one equipped with a wireless LAN communication function has come into widespread use. In recent years, an information processing apparatus compatible with wireless LAN communication in a 5 GHz band has also started to be developed. For example, Japanese Laid-Open Patent Publication (Kokai) No. 2008-236081 discloses an image processing apparatus on which can a wireless LAN board compatible with the 5 GHz band can be mounted. In Japanese Laid-Open Patent Publication (Kokai) No. 2008-236081, in a case where extended function-applying means is mounted on the image processing apparatus, when compatibility information items stored in the respective non-volatile memories match each other, the latest information items of the information items stored in the image processing apparatus and the extended function-applying means are validated. This makes it possible to set frequency bands and frequency channels in the 5 GHz band, in which available channels are different depending on wireless standards and a radio law of each country, according to the standards of a country where the image processing apparatus is used.

However, in Japanese Laid-Open Patent Publication (Kokai) No. 2008-236081, specifically, a service person or the like inputs a setting of area information of a country to the image processing apparatus. Then, the image processing apparatus executes the setting after confirming that the use of the extended function-applying means has already been applied and approved in the corresponding country. In this case, however, there remains a possibility that a setting of area information of a wrong country is erroneously input to the image processing apparatus, and what is worse, the use of the extended function-applying means has already been applied and approved in the wrong country, which means that the setting is executed based on the area information of the wrong country. As a result, there is a possibility that the image processing apparatus performs wireless communication which is not conformant to the standards in the country where the image processing apparatus is used, by using the extended function-applying means.

As described above, the information processing apparatus, such as an image forming apparatus, is required to be capable of making correct settings for wireless communication of which standards are different depending on the country, in conformity to the standards of a country where the information processing apparatus is used.

SUMMARY OF THE INVENTION

The present invention provides an information processing apparatus that is capable of making correct settings for wireless communication of which standards are different depending on the country, in conformity to the standards of a country where the information processing apparatus is used, a wireless communication module, a method of controlling the information processing apparatus, and a storage medium.

In a first aspect of the present invention, there is provided an information processing apparatus on which a wireless communication module can be mounted which can be used in a plurality of specific countries and stores group identification information indicative of the plurality of specific countries in a module storage unit, including an acquisition unit configured to acquire the group identification information from the module storage unit of the mounted wireless communication module, and a setting unit configured to make settings for enabling wireless communication using the mounted wireless communication module, by using setting information on the acquired group identification information.

In a second aspect of the present invention, there is provided a method of controlling an information processing apparatus on which a wireless communication module can be mounted which can be used in a plurality of specific countries and stores group identification information indicative of the plurality of specific countries in a module storage unit, the method including acquiring the group identification information from the module storage unit of the mounted wireless communication module, and making settings for enabling wireless communication using the mounted wireless communication module, by using setting information on the acquired group identification information.

According to the present invention, the information processing apparatus, such as an image forming apparatus, is increased in the possibility that is capable of making correct settings for wireless communication of which standards are different depending on the country, in conformity to the standards of a country where the information processing apparatus is used.

Further features of the present invention will become apparent from the following description of exemplary embodiments (with reference to the attached drawings).

BRIEF DESCRIPTION OF THE DRAWINGS

FIG. 5 is a diagram useful in explaining basic allocation of frequency bands and frequency channels in 5 GHz.

FIGS. 6A to 6C are diagrams useful in explaining destination groups each formed by a plurality of specific countries.

FIG. 6D is a diagram useful in explaining a setting information table for wireless communication with respect to a plurality of groups, which is stored in a body-side storage device of the image forming apparatus shown in FIG. 1A.

FIGS. 11A and 11B are diagrams useful in explaining basic allocation of frequency channels to device destinations in a second embodiment.

DESCRIPTION OF THE EMBODIMENTS

The present invention will now be described in detail below with reference to the accompanying drawings showing embodiments thereof. However, the configurations of the following embodiments are described only by way of example and are by no means intended to limit the scope of the present invention to them alone.

Figure 1A:
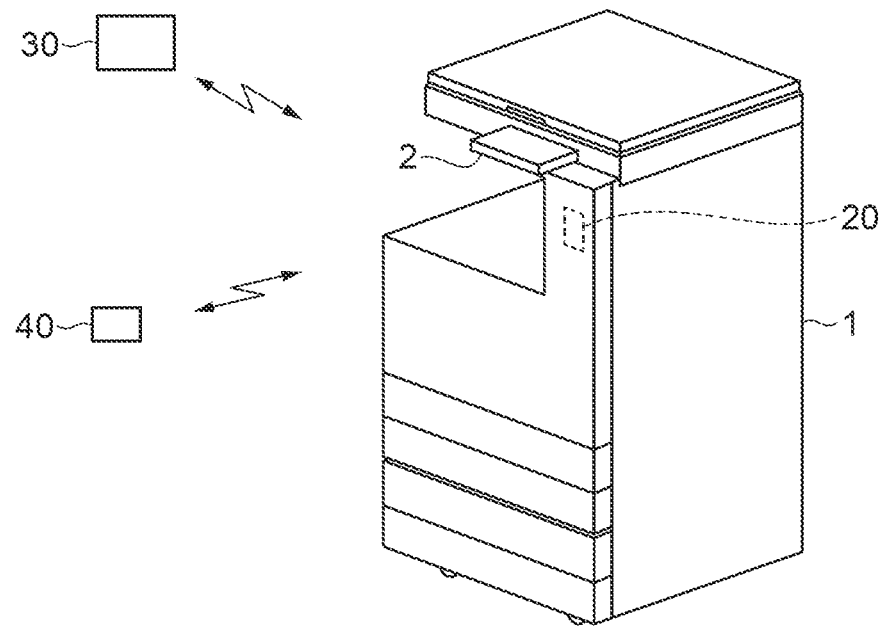
FIG. 1A is a schematic perspective view of an image forming apparatus as an information processing apparatus according to embodiments of the present invention.
Figure 1B:
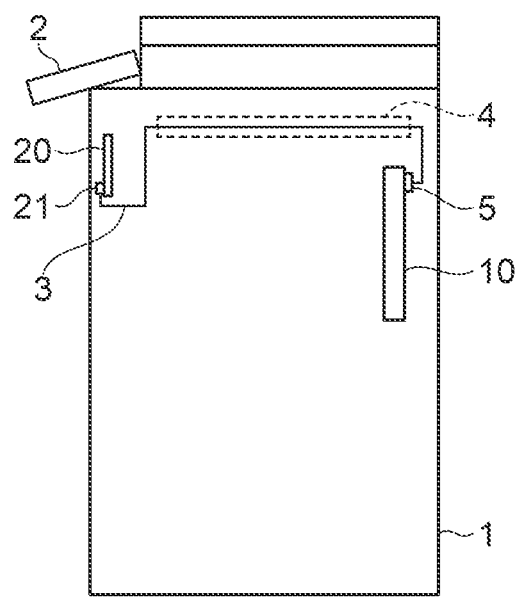
FIG. 1B is a schematic right-side view of an internal structure of the image forming apparatus shown in FIG. 1A.
Figure 1C:
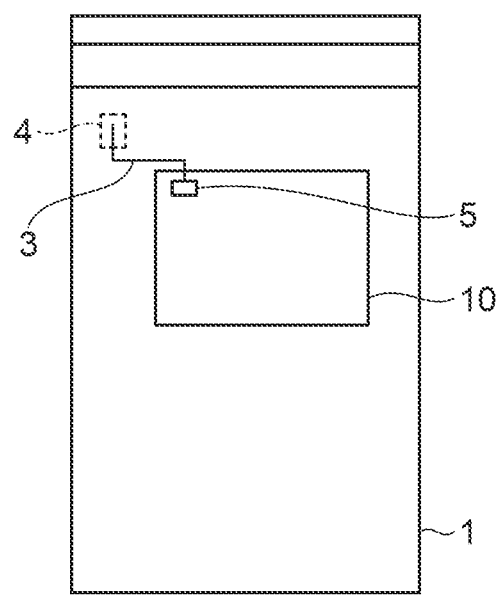
FIG. 1C is a schematic rear view showing the internal structure of the image forming apparatus shown in FIG. 1A.

FIG. 1A is a schematic perspective view of an image forming apparatus 1 as an information processing apparatus according to a first embodiment of the present invention. FIG. 1B is a schematic right-side view showing an internal structure of the image forming apparatus 1 shown in FIG. 1A. FIG. 1C is a schematic rear view showing the internal structure of the image forming apparatus 1 shown in FIG. 1A. The image forming apparatus 1 shown in FIGS. 1A to 1C is a multifunction peripheral equipped with a plurality of functions involving image formation, such as a copy function, a scan function, and a print function. The image forming apparatus 1 is provided with a console panel 2 at the top thereof which performs display for receiving an input operation by a user.

A wireless LAN module 20 used for wireless communication can be mounted inside the image forming apparatus 1. The wireless LAN module 20 as an extended function of the image forming apparatus 1 is mounted by a service person or the like as an option of the image forming apparatus 1 after installing the image forming apparatus 1. The wireless LAN module 20 establishes a communication path conformant to predetermined standards with a wireless LAN access point 30 located outside the image forming apparatus 1, a mobile terminal 40 of a user, and so forth. The wireless LAN module 20 is capable of transmitting and receiving data packets between the image forming apparatus 1 and the wireless LAN access point 30 or the user's mobile terminal 40, using the established communication path, following a procedure conformant to the predetermined standards.

Figure 2:
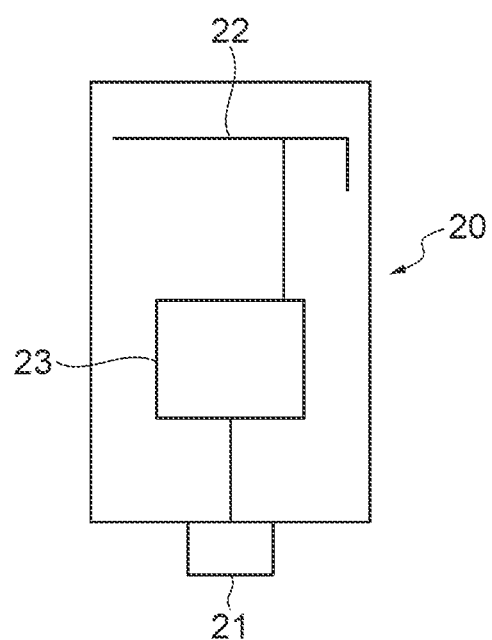
FIG. 2 is an explanatory view of a wireless LAN module as a wireless communication module which can be mounted on the image forming apparatus shown in FIG. 1A.

FIG. 2 is an explanatory view of the wireless LAN module 20 as a wireless communication module which can be mounted on the image forming apparatus 1 shown in FIG. 1A. The wireless LAN module 20 shown in FIG. 2 includes a wireless LAN control IC 23 mounted on a printed circuit board, a pattern antenna 22 formed on the printed circuit board, and a USB connector 21 used for external connection. The wireless LAN module 20 is disposed at a front-side location of the image forming apparatus 1, where the console panel 2 is disposed, as shown in FIGS. 1A and 1B. To the USB connector 21, a USB cable 3 can be connected. The wireless LAN module 20 is electrically connected to a controller 10 of the image forming apparatus 1, disposed at a rear-side location of the image forming apparatus 1. The USB cable 3 is laid from the front-side location to the rear-side location of the image forming apparatus 1 through a cable guide 4. Therefore, the service person or the like can easily connect the wireless LAN module 20 to the controller 10 using the USB cable 3.

Figure 3:
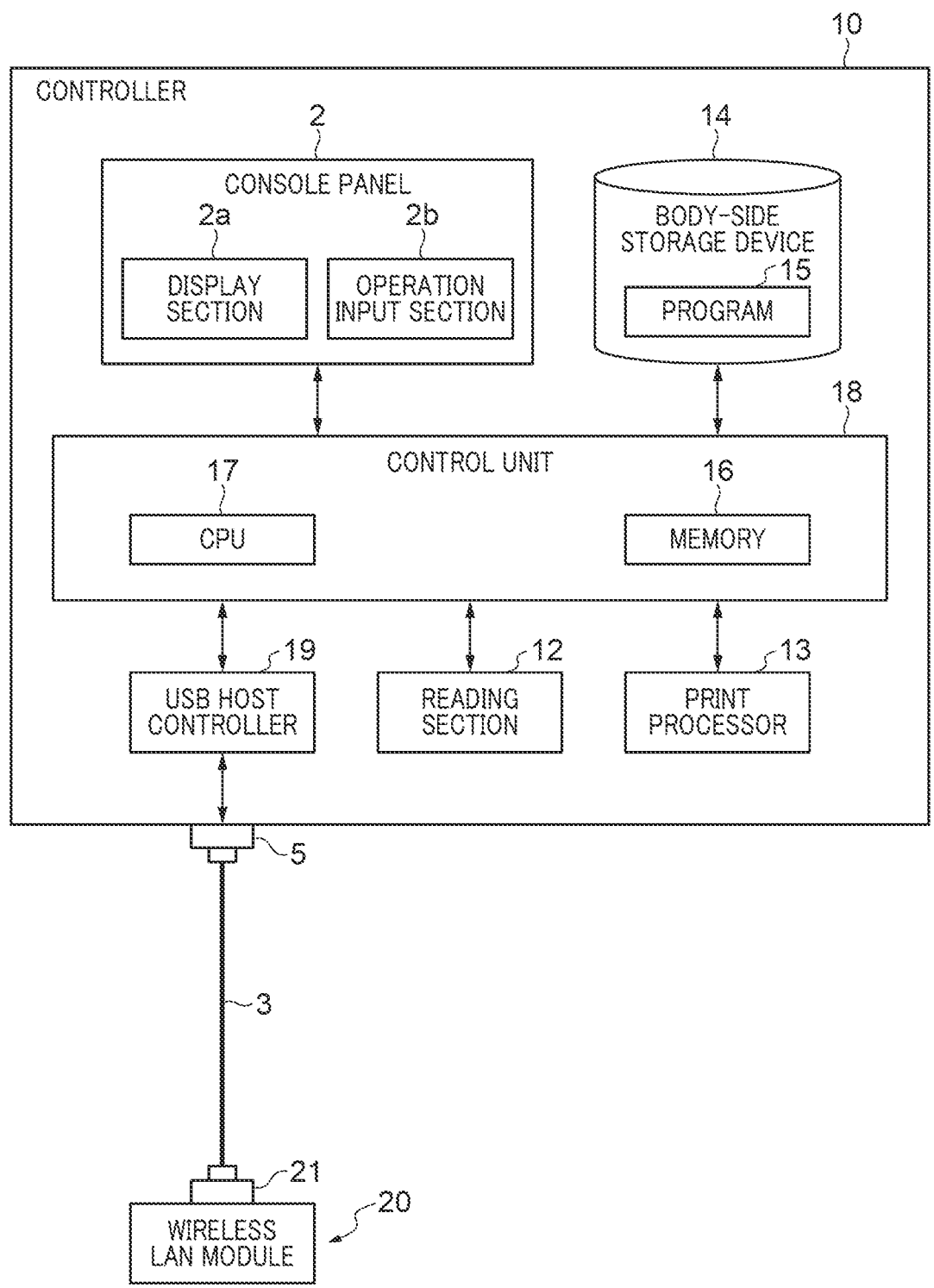
FIG. 3 is a block diagram of a controller of the image forming apparatus shown in FIG. 1A.

FIG. 3 is a block diagram of the controller 10 of the image forming apparatus 1 shown in FIG. 1A. The controller 10 of the image forming apparatus 1, shown in FIG. 3, includes the console panel 2, a reading section 12, a print processor 13, a USB host controller 19, a body-side storage device 14 as body-side storing means, a memory 16, and a CPU 17 to which these components are connected via a bus, not shown.

The console panel 2 includes a display section 2a that is formed by e.g. a liquid crystal panel and displays a variety of information, and an operation input section 2b that receives an operation instruction from a user by detecting an operation performed on the display section 2a. The operation input section 2b may be a touch panel. In this case, the operation input section 2b may be formed integrally with the liquid crystal panel of the display section 2a. The user can operate the touch panel as the operation input section 2b according to a screen displayed on the liquid crystal panel of the display section 2a. The reading section 12 is a processing section that generates image data by reading an original image. The reading section 12 may include an original conveying section that conveys a plurality of original sheets placed on an original table, not shown, from the top one by one, an image data output section that generates image data by converting the read original image, and so forth. The print processor 13 is a processing section that outputs a print product by executing print processing based on image data. The print processor 13 may include, for example, an image forming section that performs image formation based on image data, a transfer section that transfers a toner image (image) formed by the image forming section onto each of sheets fed one by one, and a fixing section that fixes the toner image transferred onto the sheet. The print processor 13 may include a print product-conveying section that discharges a print product which has been printed, and the like.

The USB host controller 19 is connected to a USB connector 5. To the USB connector 5, the wireless LAN module 20 can be connected via the USB cable 3. When the wireless LAN module 20 is connected, the USB host controller 19 can execute data communication based on the USB standard with the wireless LAN module 20 via the USB connector 5 and the USB cable 3.

The body-side storage device 14 is a storage device for storing a variety of information. The body-side storage device 14 may store programs 15 executed by the CPU 17. The programs 15 may include a communication control program executed when performing wireless communication using the wireless LAN module 20 even in a case where the wireless LAN module 20 is not mounted on the image forming apparatus 1. The memory 16 is a temporal storage area used by the CPU 17. The CPU 17 loads the programs 15 stored in the body-side storage device 14 into the memory 16 and executes the loaded programs 15. With this, the CPU 17 functions as a control unit 18 that controls the overall operation of the image forming apparatus 1. The CPU 17 as the control unit 18 communicates e.g. with the wireless LAN module 20 via the USB host controller 19. The CPU 17 as the control unit 18 is capable of executing setting control of the wireless LAN module 20 and control of data communication using the wireless LAN module 20.

Figure 4:
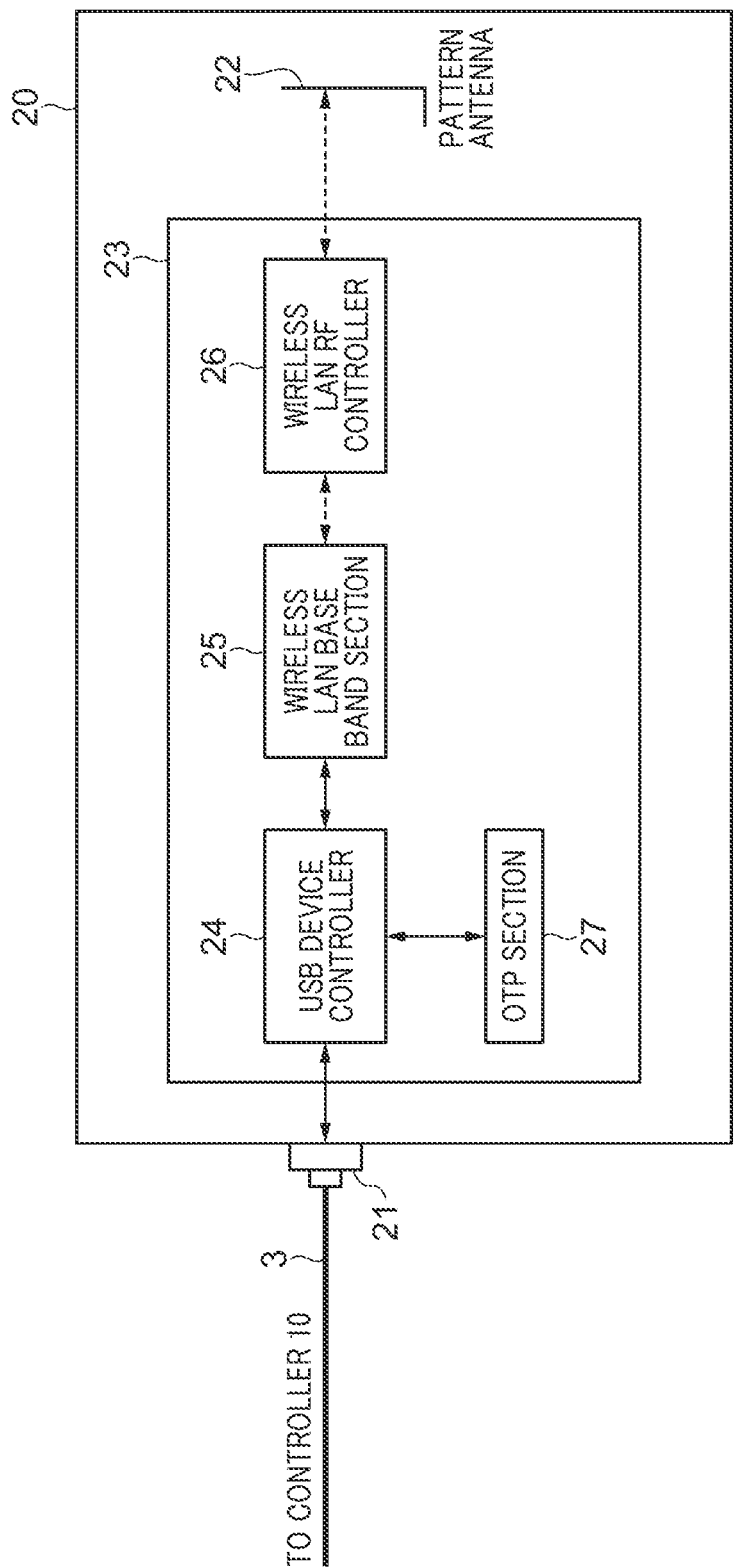
FIG. 4 is a block diagram of the wireless LAN module shown in FIG. 2.

FIG. 4 is a block diagram of the wireless LAN module 20 shown in FIG. 2. The wireless LAN module 20 shown in FIG. 4 includes the USB connector 21, the pattern antenna 22, and the wireless LAN control IC 23 to which these components are connected. The wireless LAN control IC 23 is an IC chip that performs wireless LAN communication processing. For example, the wireless LAN control IC 23 includes, as components of a block for performing wireless LAN communication control, a USB device controller 24, a wireless LAN baseband section 25, a wireless LAN RF controller 26, and an OTP (One Time Password) section 27.

The pattern antenna 22 is an antenna for performing wireless communication with the external wireless LAN access point 30 or with the mobile terminal 40. The pattern antenna 22 may be formed by pattern wiring on the printed circuit board of the wireless LAN module 20. The USB connector 21 is a connector to which the USB cable 3 can be connected.

The USB device controller 24 controls inputting and outputting of data from and to the controller 10 via the USB cable 3. The USB device controller 24 controls the operation of each block of the wireless LAN control IC 23. The USB device controller 24 holds information on a vendor ID, a product ID, and so forth, of a USB associated with the wireless LAN control IC 23, therein. The wireless LAN baseband section 25 is configured to perform baseband signal processing in wireless communication and performs communication control based on wireless communication standards. The wireless LAN RF controller 26 performs modulation and demodulation of electromagnetic waves for RF communication based on wireless communication standards when performing wireless communication with the external wireless LAN access point 30 or the mobile terminal 40.

The OTP section 27 is implemented by a one-time PROM which is a nonvolatile memory. Although the OTP section 27 is a writable and readable memory, but writing is possible only once. The information stored in the OTP section 27 cannot be rewritten. The OTP section 27 holds a variety of communication parameters which are to be set for the wireless LAN baseband section 25 and the wireless LAN RF controller 26 when performing wireless communication. Further, in the OTP section 27, a country destination group number is written as group identification information of a country as a shipment destination at the time of factory shipment of the wireless LAN module 20. Writing in and reading from the OTP section 27 are executed by the USB device controller 24.

FIG. 5 is a diagram useful in explaining basic allocation of frequency bands and frequency channels in 5 GHz. The wireless LAN module 20 can perform wireless communication in the frequency bands of 5 GHz as a first frequency band in which the details of the communication standards are different depending on the country, and the frequency bands of 2.4 GHz as a second frequency band in which the details of the communication standards are common to a plurality of countries. The frequency bands of 2.4 GHz have been conventionally used, and the frequency bands of 5 GHz have started to be widely used in recent years.

As shown in FIG. 5, the 5 GHz band of the wireless LAN is divided into frequency bands of a 5.2 GHz band (W52), a 5.3 GHz band (W53), a 5.6 GHz band (W56), and a 5.8 GHz band (W58). Further, these frequency bands are each formed by a plurality of frequency channels. More specifically, four channels of 36, 40, 44, and 48 are allocated to the 5.2 GHz band (W52). Four channels of 52, 56, 60, and 64 are allocated to the 5.3 GHz band (W53). Eleven channels of 100, 104, 108, 112, 116, 120, 124, 128, 132, 136, and 140 are allocated to the 5.6 GHz band (W56). Five channels of 149, 153, 157, 161, and 165 are allocated to the 5.8 GHz band (W58).

In each country, the wireless standards and the radio law which are different depending on the country are established with respect to the use of the 5 GHz band of the wireless LAN. For this reason, the frequency bands and the frequency channels which are available in the 5 GHz band of the wireless LAN are different depending on the country. To cope with this, in the present embodiment, a plurality of countries to which the wireless LAN module 20 is supplied are divided into groups each including a plurality of specific countries which are common in the available frequency bands and frequency channels. In each wireless LAN module 20, a group number as group identification information which is common to a plurality of specific countries, and the frequency bands and the frequency channels which are commonly available in the plurality of specific countries belonging to the corresponding group are recorded. Each wireless LAN module 20 can make settings of the frequency bands and the frequency channels recorded therein and execute wireless communication in the 5 GHz band of the wireless LAN. A plurality of specific countries belonging to each group may be selected in accordance with the convenience of selling the device.

FIGS. 6A to 6C are diagrams useful in explaining destination groups each formed by a plurality of specific countries.

Information on the destination groups each formed by a plurality of specific countries, shown in FIGS. 6A to 6C, is stored as a setting information table for wireless communication, shown in FIG. 6D, in the body-side storage device 14.

FIG. 6A is a diagram useful in explaining the details of the standards of the frequency bands and the frequency channels in 5 GHz in a group of a plurality of specific countries including the USA. More specifically, the USA, Canada, Malaysia, Mexico, and Brazil belong to the first country destination group shown in FIG. 6A. These specific countries are selected from the viewpoint of the convenience of selling the wireless LAN module 20. By referring to the availability of the frequency bands and the frequency channels demanded by the wireless standards and the radio laws of the USA, Canada, Malaysia, Mexico, and Brazil, it is know that all of the frequency channels are available in all of the above-mentioned countries with respect to the 5.2 GHz band (W52). This is also the case with the 5.3 GHz band (W53) and the 5.8 GHz band (W58). On the other hand, the available channels are different between the countries with respect to the 5.6 GHz band (W56). More specifically, in the USA, all of the frequency channels in the 5.6 GHz band (W56) are unavailable. On the other hand, for example, in Canada, the frequency channels of 120, 124, and 128 are unavailable, but the frequency channels of 100, 104, 108, 112, 116, 132, 136, and 140 are available. Further, in Malaysia, the frequency channels of 116, 120, 124, 128, 132, 136, and 140 are unavailable, but the frequency channels of 100, 104, 108, and 112 are available. In Mexico, similar to the USA, all of the frequency channels in the 5.6 GHz band (W56) are unavailable. In Brazil, all of the frequency channels in the 5.6 GHz band (W56) are available.

For the above-described first country destination group, all of the frequency channels in the 5.2 GHz band (W52), the 5.3 GHz band (W53), and the 5.8 GHz band (W58), which are commonly available in these countries, are set to be available. On the other hand, frequency channels which cannot be used in at least one country are uniformly set to be unavailable with respect to the 5.6 GHz band (W56). In this case, all of the frequency channels in the 5.6 GHz band (W56) are unavailable. In a setting table of the availability of the frequency bands and the frequency channels in 5 GHz, the above-described settings are made with respect to the first country destination group. Further, a country destination group number of 001 is assigned to the first country destination group.

FIG. 6B is a diagram useful in explaining the details of the standards of the frequency bands and the frequency channels in 5 GHz in a group of a plurality of specific countries including Japan. More specifically, Japan, the EU, and Saudi Arabia belong to the second country destination group shown in FIG. 6B. These specific countries are selected from the viewpoint of the convenience of selling the wireless LAN module 20. Referring to the availability of the frequency bands and the frequency channels demanded by the wireless standards and the radio laws of Japan, the EU, and Saudi Arabia, it is known that all of the frequency channels are available in all of the above-mentioned countries with respect to the 5.2 GHz band (W52). All of the frequency channels are also available in all of the above-mentioned countries with respect to the 5.3 GHz band (W53) and the 5.6 GHz band (W56). On the other hand, the available channels are different between the countries with respect to the 5.8 GHz band (W58). More specifically, in Japan and the EU, all of the frequency channels in the 5.8 GHz band (W58) are unavailable. On the other hand, in Saudi Arabia, the frequency channel of 165 is unavailable, but the frequency channels of 149, 153, 157, and 161 are available.

For the above-described second country destination group, all of the frequency channels in the 5.2 GHz band (W52), the 5.3 GHz band (W53), and the 5.6 GHz band (W56), which are commonly available in these countries, are set to be available. On the other hand, frequency channels which cannot be used in at least one country are uniformly set to be unavailable with respect to the 5.8 GHz band (W58). In this case, all of the frequency channels in the 5.8 GHz band (W58) are unavailable. In the setting table of the availability of the frequency bands and the frequency channels in 5 GHz, the above-described settings are made with respect to the second country destination group. Further, a country destination group number of 002 is assigned to the second country destination group.

FIG. 6C is a diagram useful in explaining the details of the standards of the frequency bands and the frequency channels in 5 GHz in a group of a plurality of specific countries including India. More specifically, India, China, and Korea belong to the third country destination group shown in FIG. 6C. These specific countries are selected from the viewpoint of the convenience of selling the wireless LAN module 20. By referring to the availability of the frequency bands and the frequency channels demanded by the wireless standards and the radio laws of India, China, and Korea, it is known that all of the frequency channels are available in all of the above-mentioned countries with respect to the 5.2 GHz band (W52) and the 5.3 GHz band (W53). On the other hand, the available channels are different between the countries with respect to the 5.6 GHz band (W56) and the 5.8 GHz band (W58). More specifically, in India and China, all of the frequency channels in the 5.6 GHz band (W56) are unavailable. On the other hand, in Korea, the frequency channels of 132, 136, and 140 are unavailable, but the frequency channels of 100, 104, 108, 112, 116, 120, 124, and 128 are available. Further, in India and China, all of the frequency channels in the 5.8 GHz band (W58) are available. On the other hand, in Korea, the frequency channel of 165 is unavailable, but the frequency channels of 149, 153, 157, and 161 are available.

For the above-described third country destination group, all of the frequency channels in the 5.2 GHz band (W52) and the 5.3 GHz band (W53), which are commonly available in these countries, are set to be available. On the other hand, in the 5.6 GHz band (W56), frequency channels which cannot be used in at least one country are uniformly set to be unavailable with respect to the 5.6 GHz band (W56). In this case, all of the frequency channels in the 5.6 GHz band (W56) are set to be unavailable. Further, the frequency channels of 149, 153, 157, and 161 are available in all of the above-mentioned countries with respect to the 5.8 GHz band (W58). However, the frequency channel of 165 is available in India and China, but unavailable in Korea. In this case, the frequency channel of 165 is set to be unavailable. For this third country destination group, all of the frequency channels in the 5.2 GHz band (W52) and the 5.3 GHz band (W53), which are commonly available in these countries, are set to be available. On the other hand, all of the frequency channels in the 5.6 GHz band (W56) are set to be unavailable. Further, the frequency channels of 149, 153, 157, and 161 are set to be available, and the frequency channel of 165 is set to be unavailable with respect to the 5.8 GHz band (W58). Further, a country destination group number of 003 is assigned to the third country destination group.

FIG. 6D is a diagram useful in explaining the setting information table for wireless communication with respect to the plurality of groups, which is stored in the body-side storage device 14 of the image forming apparatus 1. The setting information table shown in FIG. 6D may alternatively be stored in the OTP section 27 of the wireless LAN module 20. A first row of the setting information table shown in FIG. 6D records the setting information on the plurality of specific countries belonging to the first country destination group. A second row of the setting information table shown in FIG. 6D records the setting information on the second country destination group. A third row of the setting information table shown in FIG. 6D records the setting information on the third country destination group. Thus, the setting information table includes the setting information on the availability/unavailability of the frequency bands and the frequency channels for each group of a plurality of specific countries. The setting information may have settings indicative of use or settings indicative of non-use, for each frequency band and each frequency channel of 5 GHz. The body-side storage device 14 of the image forming apparatus 1 stores, when described from the viewpoint of one group number, the wireless communication setting information of a plurality of countries including countries other than a plurality of specific countries associated with the one group number, in a state classified according to groups.

Then, the OTP section 27 of each wireless LAN module 20, as a module storage unit, stores a group number indicative of a plurality of specific countries where the wireless LAN module 20 can be used, such that the image forming apparatus 1 can acquire the group number.

In this case, the image forming apparatus 1 can acquire the group number recorded in the wireless LAN module 20 and select the setting information of the corresponding group from the setting information table shown in FIG. 6D, which is stored in the body-side storage device 14 of the image forming apparatus 1. Further, the image forming apparatus 1 can set the setting information of the corresponding group for the wireless LAN module 20 for communication in the 5 GHz band. Thus, in a case where the wireless LAN modules 20 conformant to the communication standards of the 5 GHz band are manufactured and distributed to the countries of the world, the manufacturer and distributor divides the manufactured products of the wireless LAN modules 20, between groups each formed by a plurality of destination countries. To each wireless LAN module 20, it is only required to set the frequency bands and the frequency channels common to the plurality of destination countries to which the wireless LAN module 20 is supplied. By dividing the plurality of countries into groups each including a plurality of specific countries, it is no longer required to manufacture and supply wireless LAN modules 20 which are different in settings from one country to another. It is possible to reduce the load of the manufacturer and distributor that manufactures and distributes the wireless LAN modules 20. What is more, by grouping the plurality of countries into groups each formed by a plurality of specific countries, the wireless LAN module 20 can execute wireless communication in proper conformity to the wireless communication standards of a country where the corresponding wireless LAN module 20 is delivered and used.

Figure 7:
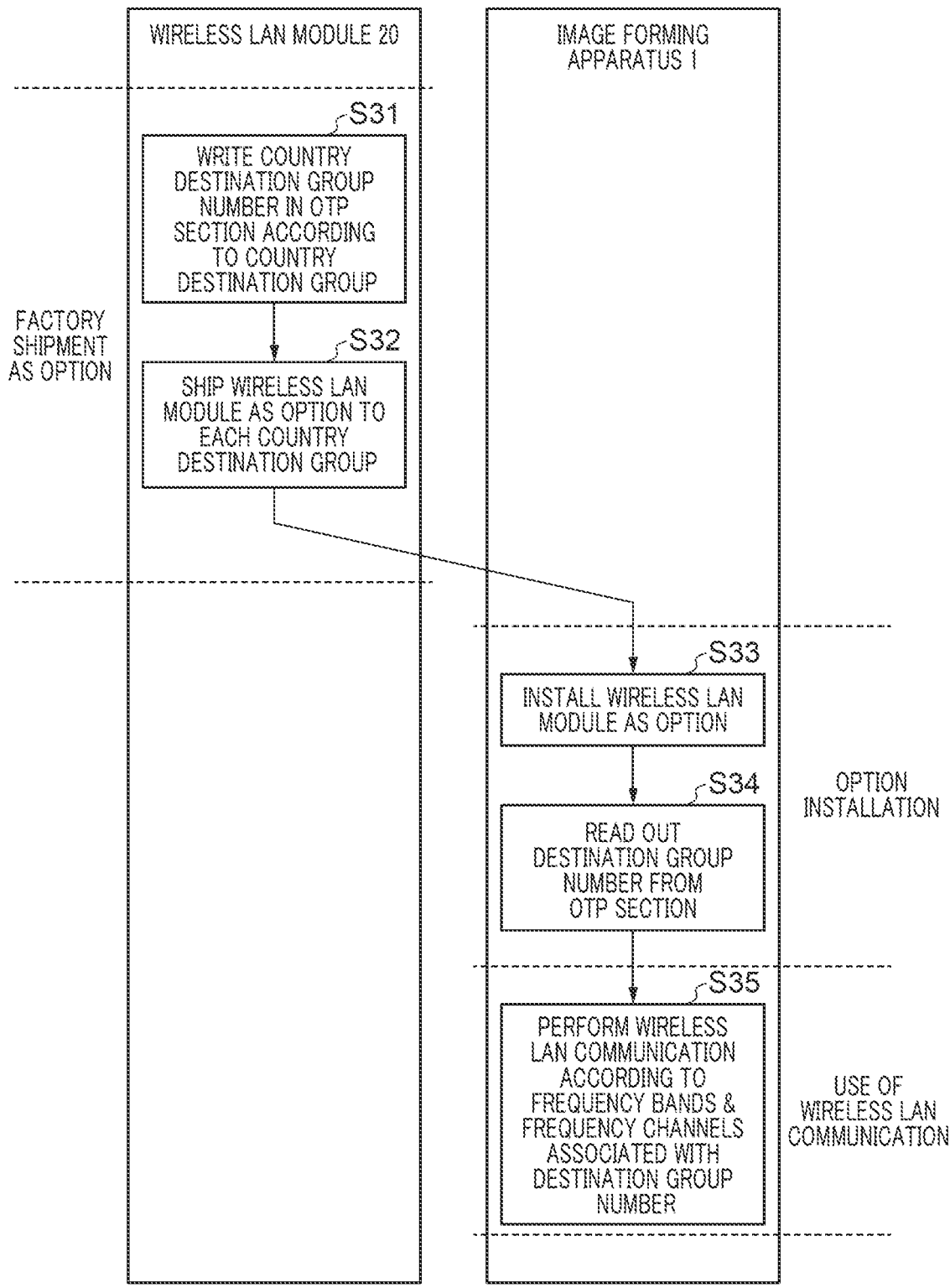
FIG. 7 is a sequence diagram showing a flow of the whole process for wireless communication in a first embodiment in a case where the wireless LAN module shown in FIG. 2 has been mounted on the image forming apparatus shown in FIG. 1A.

FIG. 7 is a sequence diagram showing a flow of the whole process for wireless communication in a case where the wireless LAN module 20 shown in FIG. 2 has been mounted on the image forming apparatus 1 shown in FIG. 1A. In FIG. 7, there are shown the image forming apparatus 1 and the wireless LAN module 20 mounted on the image forming apparatus 1. The wireless LAN module 20 has been shipped from a factory in a specific country to which the wireless LAN module 20 is adapted, as an option of the image forming apparatus 1, and has been mounted on the image forming apparatus 1 in the specific country. In FIG. 7, the time lapses from the upper side to the lower side.

In a step S31, the group number of the destination countries is written into the wireless LAN module 20 when shipped from the manufacturing factory. More specifically, one of the above-described country destination group numbers is written into the OTP section 27 of the wireless LAN module 20. The wireless LAN module 20 of the present embodiment is capable of USB connection. In this case, the wireless LAN module 20 can be connected to a PC by the USB cable 3. A dedicated PC for setting, which is used in the manufacturing factory, may execute writing using dedicated software. In a step S32, the wireless LAN modules 20 in which the destination country number has been written are shipped as an optional part to each associated country destination group. Each wireless LAN module 20 is sold and used in an associated destination country.

In a step S33, the wireless LAN module 20 is mounted and installed in the image forming apparatus 1 at a user's place. When installing the wireless LAN module 20, a service person may perform work for mounting the wireless LAN module 20 on the image forming apparatus 1. In this case, the service person mounts the wireless LAN module 20 at the front-side location of the image forming apparatus 1 as a predetermined position. The service person inserts the USB cable 3 through the cable guide 4. The service person connects between the USB connector 21 of the wireless LAN module 20 and the USB connector 5 of the controller 10 using the USB cable 3. In a step S34, the service person starts up the image forming apparatus 1 on which the wireless LAN module 20 has been mounted. This enables the image forming apparatus 1 to access the OTP section 27 of the wireless LAN module 20 and acquire the group number indicative of the destination countries of the wireless LAN module 20 mounted thereon. In a step S35, the image forming apparatus 1 makes settings for communication, which are associated with the group number, and executes wireless communication in the frequency bands and the frequency channels associated with the country where the image forming apparatus 1 is being used. Thus, the user can make use of wireless communication by the image forming apparatus 1.

Here, the operations of the image forming apparatus 1 performed for the processing for reading out the destination county number in the step S34 and the processing for using wireless communication in the step S35 in FIG. 7 will be described in more detail.

Figure 8:
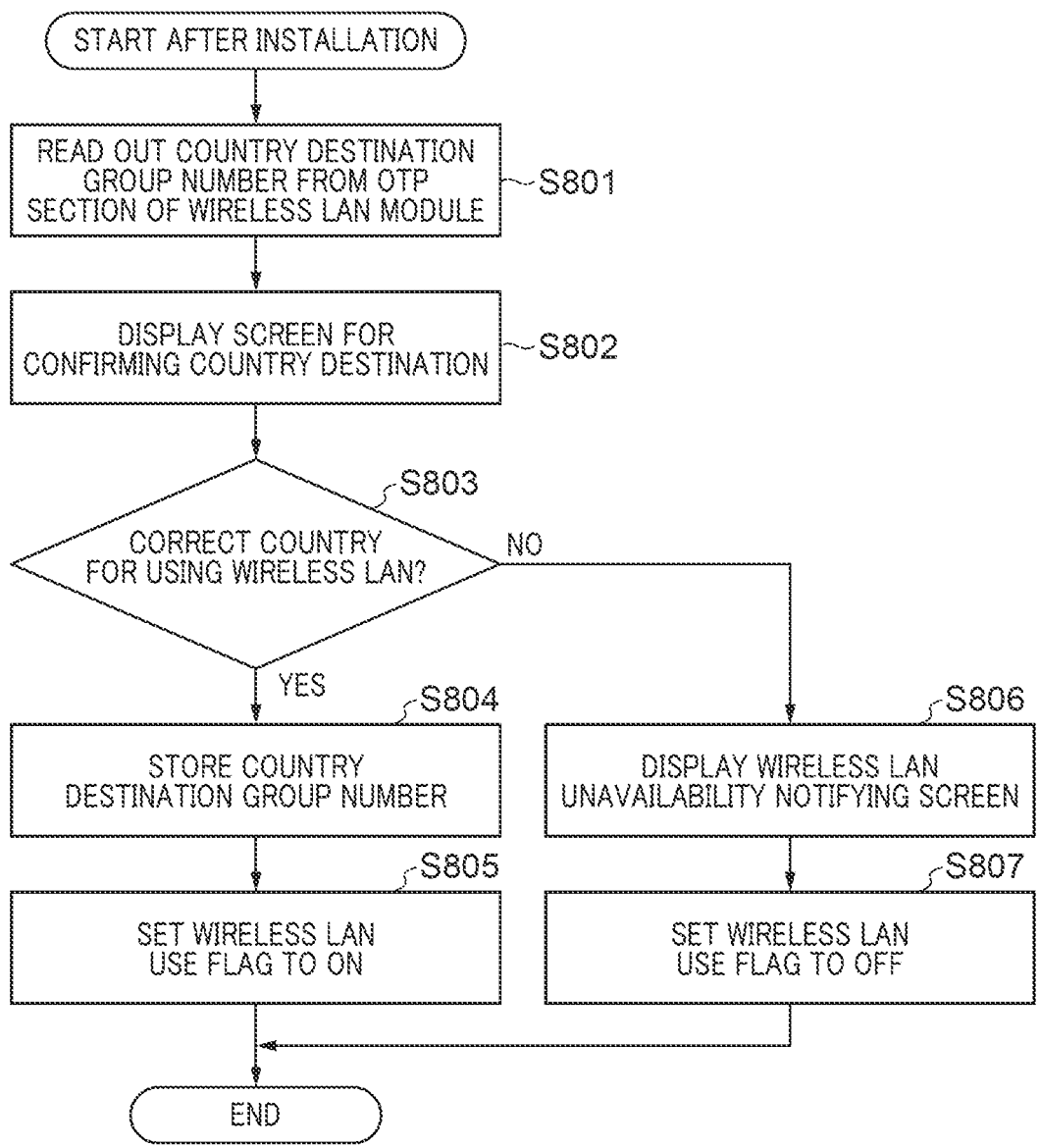
FIG. 8 is a flowchart of a setting control process performed in the first embodiment by a control unit appearing in FIG. 3 after the wireless LAN module shown in FIG. 2 has been mounted and installed in the image forming apparatus shown in FIG. 1A.

FIG. 8 is a flowchart of a setting control process performed by the control unit 18 appearing in FIG. 3 after the wireless LAN module 20 shown in FIG. 2 has been mounted and installed in the image forming apparatus 1 shown in FIG. 1A. The control unit 18 of the image forming apparatus 1 executes the setting control process in FIG. 8 e.g. when the image forming apparatus 1 is started up first after installation of the image forming apparatus in the step S34 in FIG. 7. The control unit 18 of the image forming apparatus 1 may repeatedly execute the setting control process in FIG. 8 e.g. when the image forming apparatus 1 is started up first after the reset of the image forming apparatus 1.

In a step S801, the control unit 18 communicates with the USB device controller 24 of the connected wireless LAN module 20 and reads out the country destination group number written in the OTP section 27 of the wireless LAN module 20. With this, the control unit 18, as an acquiring unit, can acquire the group number from the OTP section 27 of the mounted wireless LAN module 20. In a step S802, the control unit 18 reads out information on a plurality of countries (specific countries) belonging to the country destination group number acquired from the connected wireless LAN module 20, from the setting information table stored in the body-side storage device 14. The control unit 18 displays a screen for confirming the read information on the plurality of countries (specific countries) on the display section 2a of the console panel 2. With this, the control unit 18, as a user interface unit, can notify the user, for confirmation, of whether or not the mounted wireless LAN module is destined for the country where the image forming apparatus 1 is being used. In a step S803, the control unit 18 judges a result of the confirmation performed by the user on the confirmation screen. If the user has operated the console panel 2 by judging that the country destination is correct, i.e. the mounted wireless LAN module is destined for the country where the image forming apparatus 1 is being used, the control unit 18 detects this result via the operation input section 2b of the console panel 2, and proceeds to a step S804. If the user is operating the console panel 2, by judging that the user is using the wireless LAN module in a wrong country, i.e. the mounted wireless LAN module is not for the country where the image forming apparatus 1 is being used, the control unit 18 detects this result via the operation input section 2b of the console panel 2, and proceeds to a step S806.

In the step S804, the control unit 18 stores the country destination group number which is acquired from the wireless LAN module 20 and based on which the use has confirmed that the wireless LAN module 20 is being used in the correct country, in the body-side storage device 14. In a step S805, the control unit 18 sets a wireless LAN use flag to ON and stores the value of the flag in the body-side storage device 14. Thus, in a case where a plurality of specific countries are confirmed by the user interface unit, the control unit 18, as a setting unit, can make settings for enabling wireless communication using the wireless LAN module 20 by using the acquired setting information of the corresponding group. Then, the control unit 18 terminates the present control.

In the step S806, the control unit 18 displays an unavailability notifying screen indicating that the country destination is not correct, i.e. the wireless LAN module is not being used in a correct country, and hence the wireless LAN cannot be used, on the display section 2a of the console panel 2. In a step S807, the control unit 18 sets the wireless LAN use flag to OFF and stores the value of the flag in the body-side storage device 14. Thus, in a case where the plurality of specific countries are not confirmed by the user interface unit, the control unit 18 as the setting unit can make settings for inhibiting wireless communication using the mounted wireless LAN module 2. Note that the wireless LAN module 20 is capable of performing wireless communication in the 5 GHz band in which the details of the communication standards are different between specific countries in a plurality of groups each associated with a group number, and the 2.4 GHz in which the details of the communication standards are common to the countries in the plurality of groups. Therefore, the control unit 18 may make settings for inhibiting only wireless communication using the 5 GHz band out of the 5 GHz band and the 2.4 GHz band. Then, the control unit 18 terminates the present control.

Figure 9A:
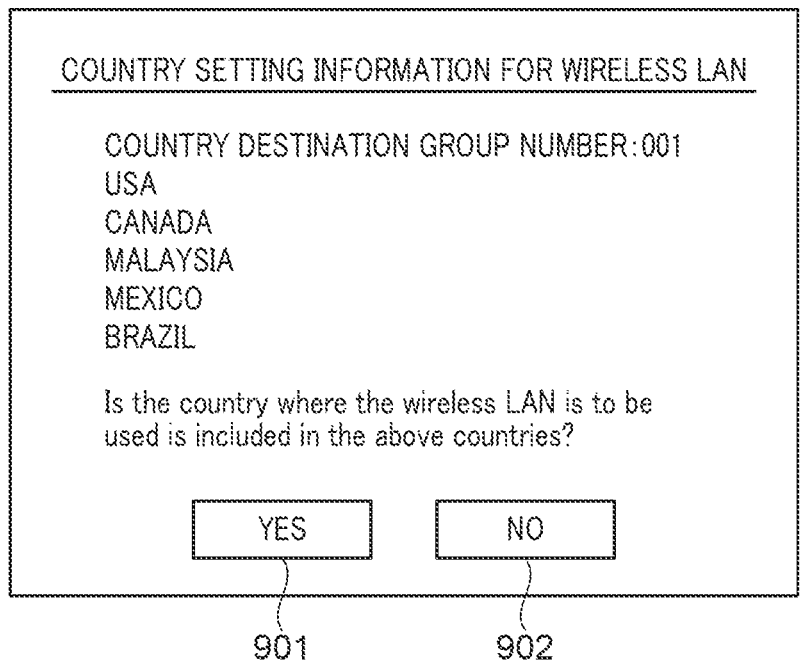
FIGS. 9A and 9B are diagrams useful in explaining a variety of screens displayed on a display section appearing in FIG. 3, in the first embodiment.
Figure 9B:
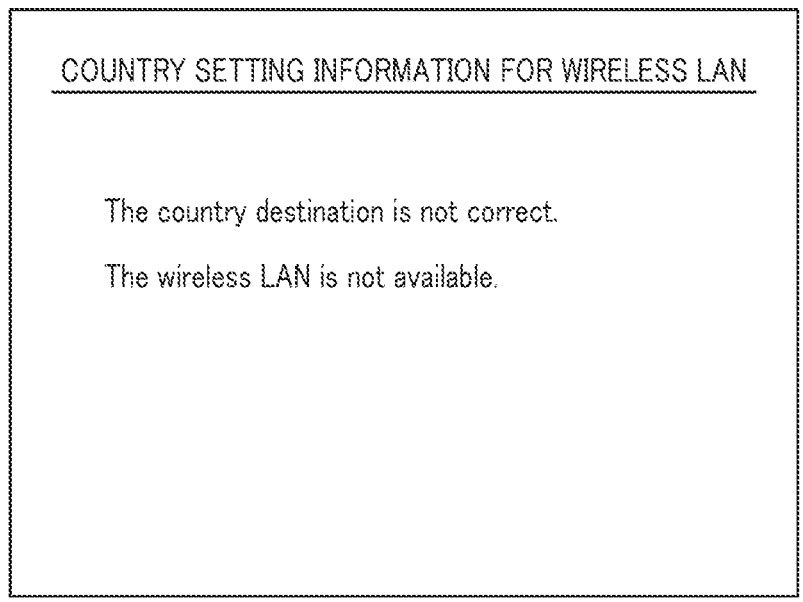

FIGS. 9A and 9B are diagrams useful in explaining a variety of screens displayed on the display section appearing in FIG. 3. FIG. 9A is a diagram useful in explaining the confirmation screen displayed on the display section 2a appearing in FIG. 3. The control unit 18 displays the confirmation screen shown in FIG. 9A on the display section 2a of the console panel 2 in the step S802 in FIG. 8. The confirmation screen shown in FIG. 9A displays a confirmation button 901 indicating "YES" and a confirmation button 902 indicating "NO" together with the information on the plurality of countries (specific countries) belonging to the country destination group number acquired from the connected wireless LAN module 20. If the country where the image forming apparatus 1 is being used is displayed on the confirmation screen shown in FIG. 9A, the service person or the like operates the confirmation button 901 indicating "YES". In this case, the control unit 18 determines in the step S803 that the user has operated the console panel 2 by judging that the country destination is correct, and proceeds to the step S804. If the country where the image forming apparatus 1 is being used is not displayed on the confirmation screen shown in FIG. 9A, the service person or the like operates the confirmation button 902 indicating "NO". In this case, the control unit 18 determines in the step S803 that the user has operated the console panel 2 by judging that the country destination is not correct and, and proceeds to the step S806.

FIG. 9B is a diagram useful in explaining the unavailability notifying screen displayed on the display section 2a appearing in FIG. 3. The control unit 18 displays the unavailability notifying screen shown in FIG. 9B on the display section 2a of the console panel 2 in the step S806 in FIG. 8. This enables the service person or the like to be aware that the wireless LAN module 20 cannot be used in the country where the image forming apparatus 1 is being used.

Figure 10:
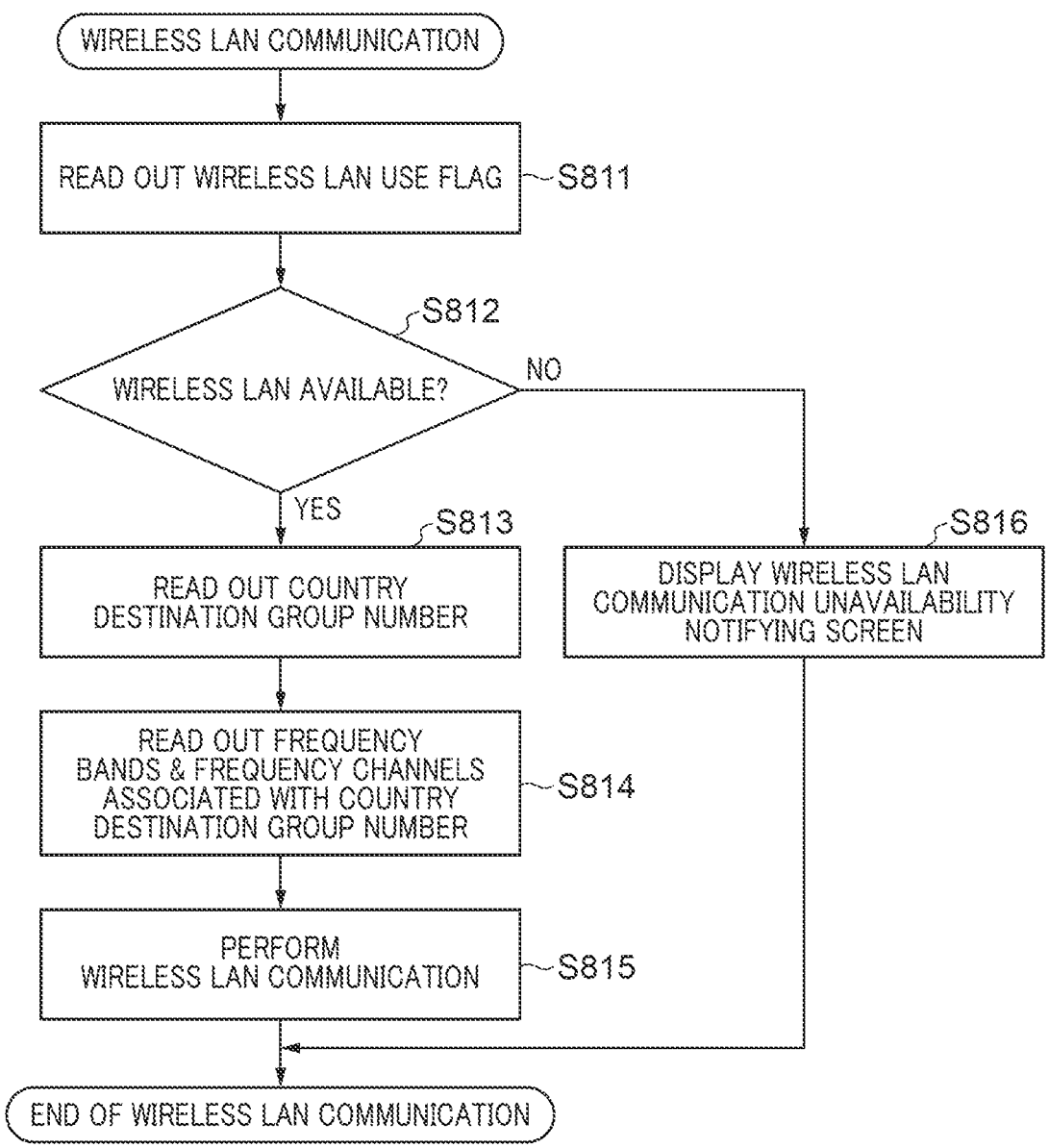
FIG. 10 is a flowchart of a wireless communication control process performed by the control unit appearing in FIG. 3 after the setting control process in FIG. 8 of the first embodiment.

FIG. 10 is a flowchart of a wireless communication control process performed by the control unit 18 shown in FIG. 3 after the setting control process in FIG. 8. The control unit 18 of the image forming apparatus 1 as a communication execution unit repeatedly executes the wireless communication control in FIG. 10, in the step S35 in FIG. 7 when the image forming apparatus 1 is active, and executes wireless communication using the mounted wireless LAN module 20.

In a step S811, the control unit 18 reads out the wireless LAN use flag from the body-side storage device 14. With this, the control unit 18 as the communication execution unit can acquire the settings set by the setting unit before executing wireless communication using the wireless LAN module 20. In a step S812, the control unit 18 determines a value of the wireless LAN use flag. If the wireless LAN use flag read out in the step S811 is set to ON, the control unit 18 determines that the wireless LAN can be used, and proceeds to a step S813. If the wireless LAN use flag read out in the step S811 is set to OFF, the control unit 18 determines that the wireless LAN cannot be used, and proceeds to a step S816.

In the step S813, the control unit 18 reads out the country destination group number stored in the body-side storage device 14. In a step S814, the control unit 18 reads out the information on the frequency bands and the frequency channels associated with the country destination group number read out in the step S813 from the table stored in the body-side storage device 14. Here, the control unit 18 may output the read information on the availability/unavailability of the frequency bands and the frequency channels to the USB device controller 24 of the wireless LAN module 20 connected via the USB host controller 19 and the USB cable 3. In this case, the USB device controller 24 makes necessary settings for the wireless LAN baseband section 25 and the wireless LAN RF controller 26 based on the frequency bands and the frequency channels acquired from the control unit 18.

In a step S815, the control unit 18 performs wireless communication by controlling the wireless LAN baseband section 25 and the wireless LAN RF controller 26 via the USB device controller 24 of the connected wireless LAN module 20. Here, the wireless LAN module 20 executes wireless communication using the available frequency bands and frequency channels, based on the information on the availability/unavailability of the frequency bands and the frequency channels read out in the step S814. With this, in a case where it is confirmed that the mounted wireless LAN module 20 can be used for wireless communication, the control unit 18 can execute wireless communication using the mounted wireless LAN module 20. Then, the control unit 18 terminates the present control.

In the step S816, since the acquired wireless LAN use flag is set to OFF, the control unit 18 displays a screen for notifying the user that the wireless LAN cannot be used, on the display section 2a of the console panel 2. The control unit 18 may display e.g. the unavailability notifying screen shown in FIG. 9B on the display section 2a of the console panel 2. This enables the service person or the like to be aware that the wireless LAN module 20 cannot be used in the country where the image forming apparatus 1 is being used. Then, the control unit 18 terminates the present control. In this case, the control unit 18 terminates the present control without executing wireless communication.

As described above, in the present embodiment, the wireless LAN module 20 mounted in the image forming apparatus 1 stores a group number indicative of a plurality of specific countries in which the wireless LAN module 20 can be used, in the OTP section 27. Further, the image forming apparatus 1 stores the wireless communication setting information of groups each formed by a plurality of countries including the plurality of specific countries associated with the group number, in the body-side storage device 14. The image forming apparatus 1 acquires the group number from the OTP section 27 of the wireless LAN module 20 mounted thereon. The image forming apparatus 1 makes settings for enabling wireless communication using the mounted wireless LAN module 20 based on the setting information stored in the body-side storage device 14 in association with the acquired group number. Thus, in the present embodiment, the settings made by the image forming apparatus 1 hardly disables the mounted wireless LAN module 20 from correctly performing wireless communication but enables the wireless LAN module 20 to correctly perform wireless communication. The wireless LAN module 20 is capable of performing correct wireless communication due to compatible settings made therefor. In using the 5 GHz band of the wireless LAN, it is possible to positively avoid violation of the wireless standards or the radio law, caused by radiation of radio waves in a frequency band and a frequency channel which are not allowed to be used, due to a setting error.

Thus, in the present embodiment, a possibility is increased that settings for wireless communication of which details of demanded standards are different depending on the country can be correctly made for the image forming apparatus 1 according to the standards of a country where the image forming apparatus 1 is used. The wireless LAN modules 20 are distributed and sold, basically on a country-by-country basis. Therefore, in a case where the wireless LAN module 20 acquired via a regular distribution route is mounted, the image forming apparatus 1 can make correct settings for wireless communication according to the wireless communication standards of each country.

Further, in the present embodiment, in the OTP section 27 of the wireless LAN module 20, a mere group number indicative of a plurality of specific countries is recorded, but the wireless communication setting information itself in the plurality of specific countries where the wireless LAN module 20 can be used is not recorded. The wireless communication setting information in the plurality of specific countries where the wireless LAN module 20 can be used is recorded in the body-side storage device 14 of the image forming apparatus 1. Therefore, it is not required to provide the large-capacity OTP section 27 for recording the wireless communication setting information of the plurality of groups, in the wireless LAN module 20, so as to realize the above-described proper settings. It is possible to realize the above-described proper settings without burdening the wireless LAN module 20 with load.

Next, a description will be given of a second embodiment of the present invention. In the above-described embodiment, the plurality of countries to which the wireless LAN module 20 is supplied are divided into groups each formed by a plurality of specific countries which are common in the frequency bands and the frequency channels. Further, in the OTP section 27 of each wireless LAN module 20, a group number corresponding to a destination country of each wireless LAN module 20 is stored. Then, the image forming apparatus 1 acquires the group number indicative of the destination country of the wireless LAN module 20 from the OTP section 27, whereby the image forming apparatus 1 make settings and execute communication in proper conformity to the wireless communication standards in the country where the image forming apparatus 1 is used.

However, among countries in which the wireless standards and the radio laws are regulated, there is a country where the use of the 5 GHz band itself is not approved. For example, in Pakistan and Bangladesh, emission of radio waves in the 5 GHz band is inhibited by law.

On the other hand, for the wireless LAN module 20, grouping is sometimes performed for each of regions, such as Asia and Europe, by considering the convenience of manufacturing and selling thereof. This is an example of grouping of device destinations. In this case, when grouping of countries is performed to form groups each formed by a plurality of specific countries which are common in the available frequency bands and frequency channels, it is impossible to obtain the commonality of the group with respect to all frequency bands and frequency channels in the 5 GHz band. In a group including a country where the use of the 5 GHz band is inhibited by law, it is impossible to obtain the commonality of the group with respect to all frequency bands and frequency channels in the 5 GHz band. In the plurality of specific countries included in this group, the wireless LAN module 20 cannot be used in the 5 GHz band.

In the present embodiment, countries where the use of the 5 GHz band is not inhibited are enabled to use the 5 GHz band while making it possible to divide the above-mentioned countries where the use of the 5 GHz band is inhibited into a plurality of groups. In the present embodiment, while enabling a country where the 5 GHz band can be used, which belongs to a group, to use the 5 GHz band, a country where the 5 GHz band is inhibited, which belongs to the group, is prevented from using the 5 GHz band. In the present embodiment, not only the group number, but also the availability/unavailability information of the 5 GHz band with respect to each of the plurality of specific countries belonging to the group indicated by the group number is stored in the OTP section 27.

The following description will be given mainly of differences from the above-described first embodiment.

In the present embodiment, an example of grouping based on device destinations will be described. In setting device destinations, the countries are grouped based on the convenience of manufacturing and selling of devices, differences in power supply voltage of electrical outlets in each country, and so forth. For example, Asian countries in which a power supply voltage of 230 V is used include Singapore, Malaysia, Pakistan, Bangladesh, and so forth. In Singapore and Malaysia, the use of the 5 GHz band is approved. On the other hand, in Pakistan and Bangladesh, the use of the 5 GHz band is not approved.

In a case where the country destination groups are used as in the above-described first embodiment, in all of the plurality of specific countries belonging to the group including these four countries, it is impossible to use the 5 GHz band by making settings therefor. In the present embodiment, this inconvenience is avoided.

FIGS. 11A and 11B are diagrams useful in explaining an example of a device destination group of a plurality of specific countries, where 230 V is used, of the Asian countries.

FIG. 11A is an explanatory diagram showing an example of the details of the standards of the frequency bands and the frequency channels in 5 GHz in a group of a plurality of specific countries including Pakistan and Bangladesh. In this example, not only Singapore and Malaysia but also Pakistan and Bangladesh belong to one device destination group.

In Singapore and Malaysia, the 5.2 GHz band (W52), the 5.3 GHz band (W53), and the 5.8 GHz band (W58) are available. The frequency channels of 132, 136, and 140 in the 5.6 GHz band (W56) are available only in Singapore.

The information on the device destination group, shown in FIG. 11A, may be stored in the body-side storage device 14, similar to the setting information table shown in FIG. 6D of the above-described embodiment. Further, the group number indicative of the group may be stored in the OTP section 27 of each wireless LAN module 20. Note that the information on the device destination group, shown in FIG. 11A, may be stored in the OTP section 27. In this case, the information on the device destination group, shown in FIG. 11A, is not required to be stored in the body-side storage device 14.

FIG. 11B is an explanatory diagram showing the availability/unavailability information of the 5 GHz band with respect to the plurality of countries. The plurality of countries in FIG. 11B belong to the device destination group shown in FIG. 11A. The 5 GHz band availability/unavailability information of the plurality of countries, shown in FIG. 11B, may be stored together with the group number of the corresponding group, in the OTP section 27. Further, information indicative of "available" is stored as the availability/unavailability information with respect to a country where use of the 5 GHz band is approved. Information indicative of "unavailable" is stored as the availability/unavailability information for a country where the use of the 5 GHz band is not approved.

In this case, the control unit 18 as the setting unit can make settings for frequency channels in the 5 GHz band, which are commonly available in countries in the group, and frequency channels in the 2.4 GHz band, for the countries where the 5 GHz band is available. For example, in the group using 230 V in ASIA in FIG. 11A, Singapore and Malaysia approves the use of the 5 GHz band. The control unit 18 may make settings for the frequency channels in the 5.2 GHz band (W52), the 5.3 GHz band (W53), part of the 5.6 GHz band (W56), the 5.8 GHz band (W58), and the 2.4 GHz band, which are commonly available in these countries, for these countries. On the other hand, in the group using 230 V in ASIA in FIG. 11A, Pakistan and Bangladesh inhibit the use of the 5 GHz band. The control unit 18 may make settings only for the frequency channels in the 2.4 GHz band, for these countries. With this, the wireless LAN modules 20 to be shipped to the plurality of specific countries belonging to the device destination group can be used by making settings for the channels conformant to the wireless standards and the radio laws of the countries belonging to the device destination group.

Figure 12:
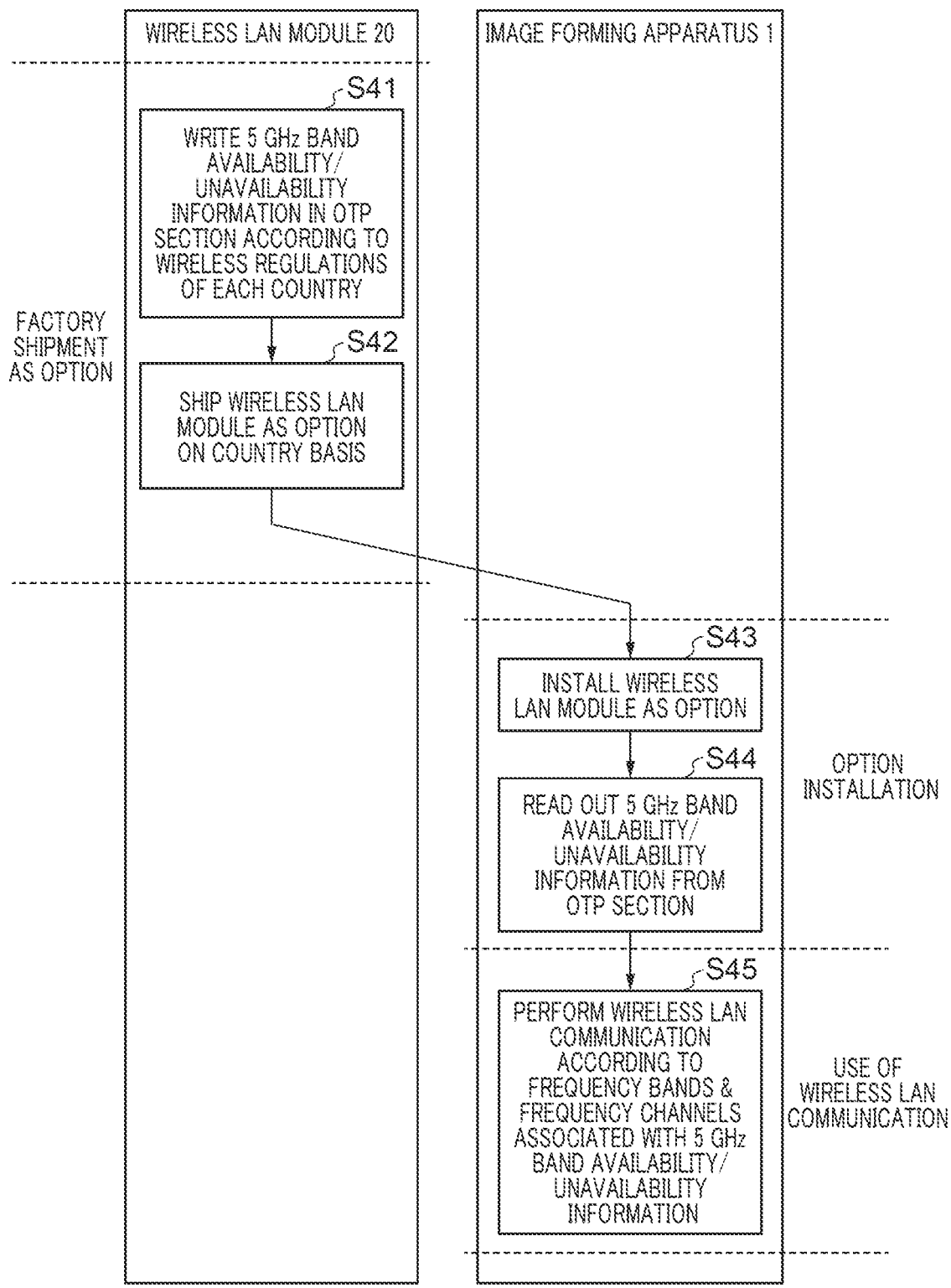
FIG. 12 is a sequence diagram showing a flow of the whole process for wireless communication in the second embodiment in a case where the wireless LAN module shown in FIG. 2 has been mounted on the image forming apparatus shown in FIG. 1A.

FIG. 12 is a sequence diagram showing a flow of the whole process for wireless communication in a case where the wireless LAN module 20 has been mounted on the image forming apparatus 1, in the second embodiment. FIG. 12 corresponds to FIG. 7.

In a step S41, the availability/unavailability information of the 5 GHz band is written into the wireless LAN module 20 when shipped from the manufacturing factory. The wireless LAN module 20 of the present embodiment is capable of USB connection. A dedicated PC for setting, which is used in the manufacturing factory, may execute writing using dedicated software.

Further, in this step S41, the group number may be written together with the availability/unavailability information of the 5 GHz band as the first frequency band. With this, the group identification information indicative of a plurality of specific countries as the destinations of the wireless LAN module 20, and the information indicating with respect to each specific country whether or not the first frequency band is available can be stored in the OTP section 27 as the module storage unit of the wireless LAN module 20.

The wireless LAN module 20 referred to here is the one which is capable of performing wireless communication in the first frequency band and the second frequency band even in a case where use of the first frequency band is inhibited in some of the plurality of specific countries belonging to the group identification information.

In a step S42, the wireless LAN modules 20 in which the availability/unavailability information of the 5 GHz band has been written are shipped as an optional part to each country. Each wireless LAN module 20 is sold and used in an associated device destination country.

In a step S43, the wireless LAN module 20 is mounted and installed in the image forming apparatus 1 at a user's place. When installing the wireless LAN module 20, a service person may perform work for mounting the wireless LAN module 20 on the image forming apparatus 1. In this case, the service person mounts the wireless LAN module 20 at the front-side location of the image forming apparatus 1 as a predetermined position. The service person inserts the USB cable 3 through the cable guide 4. The service person connects between the USB connector 21 of the wireless LAN module 20 and the USB connector 5 of the controller 10 using the USB cable 3.

In a step S44, the service person starts up the image forming apparatus 1 on which the wireless LAN module 20 has been mounted. This enables the image forming apparatus 1 to access the OTP section 27 of the wireless LAN module 20 and acquire the availability/unavailability information of the 5 GHz band, and so forth, of the wireless LAN module 20 mounted thereon.

In a step S45, the image forming apparatus 1 makes settings for communication, according to the availability/unavailability information of the 5 GHz band, and so forth. Further, the image forming apparatus 1 executes wireless communication in the frequency bands and the frequency channels associated with the country where the image forming apparatus 1 is being used. Thus, the user can make use of wireless communication by the image forming apparatus 1.

Next, the operations of the image forming apparatus 1 performed for the processing for reading out the availability/unavailability information of the 5 GHz band in the step S44 in FIG. 12 and the processing for using wireless communication in the step S45 will be described in more detail.

Figure 13:
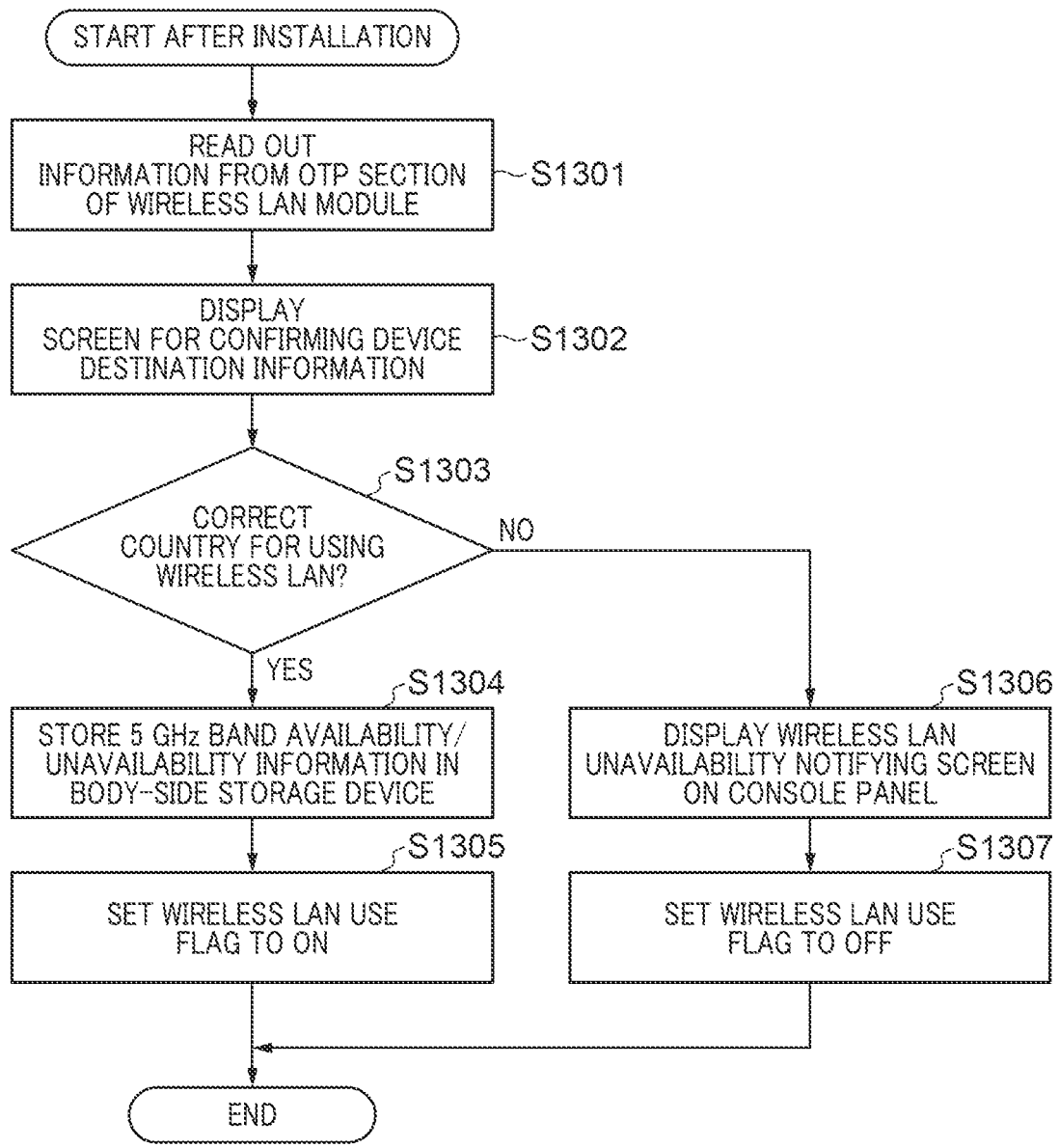
FIG. 13 is a flowchart of a setting control process performed in the second embodiment by the control unit appearing in FIG. 3 after the wireless LAN module shown in FIG. 2 has been mounted on the image forming apparatus shown in FIG. 1A.

FIG. 13 is a flowchart of a setting control process performed by the control unit 18 appearing in FIG. 3 after the wireless LAN module 20 shown in FIG. 2 has been mounted and installed in the image forming apparatus 1 shown in FIG. 1A. The control unit 18 of the image forming apparatus 1 may execute the setting control process in FIG. 13 in combination with the setting control process in FIG. 8, i.e. in succession to the setting control process in FIG. 8, e.g. when the image forming apparatus 1 is started up first after installation. The control unit 18 of the image forming apparatus 1 may also repeatedly execute the setting control process in FIG. 13 in succession to the setting control process in FIG. 8 e.g. when the image forming apparatus 1 is started up first after the reset thereof. Also, the control unit 18 can execute only the setting control process in FIG. 13 in place of the setting control process in FIG. 8.

In a step S1301, the control unit 18 communicates with the USB device controller 24 of the connected wireless LAN module 20 and reads out the availability/unavailability information of the 5 GHz band, which is written in the OTP section 27 of the wireless LAN module 20.

In a step S1302, the control unit 18 displays a confirmation screen for confirming the read information of the plurality of countries (specific countries) on the display section 2a of the console panel 2 based on the 5 GHz band availability/unavailability information read out from the OTP section 27. Note that in a case where the group number in the setting information table stored in the body-side storage device 14 is stored in the OTP section 27, the control unit 18 may display, out of the information on the countries belonging to the group number, information on a plurality of countries (specific countries) according to the availability/unavailability information of the 5 GHz band, which has been read from the OTP section 27. With this, the control unit 18, as the user interface unit, can confirm and notify the user about whether or not the mounted wireless LAN module is destined for the country where the image forming apparatus 1 is being used.

In a step S1303, the control unit 18 judges a result of the confirmation performed by the user on the confirmation screen. If the user has operated the console panel 2 by judging that the device destination is correct, i.e. the mounted wireless LAN module is destined for the country where the image forming apparatus 1 is being used, the control unit 18 detects this result via the operation input section 2b of the console panel 2, and proceeds to a step S1304. In the other cases, the control unit 18 proceeds to a step S1306.

If it is conformed by the user based on the information acquired from the wireless LAN module 20 that the device destination is correct, in the step S1304, the control unit 18 stores the availability/unavailability information for permitting use of the 5 GHz band as the first frequency band in the body-side storage device 14. With this, the control unit 18 as the setting unit can acquire the availability/unavailability information indicating with respect to the specific country confirmed by the user interface unit whether or not the first frequency band can be used, from the OTP section 27 of the wireless LAN module 20, and make settings based on the information. If a specific country where the use of the first frequency band is inhibited is confirmed by the user interface unit, the control unit 18 sets the availability/unavailability information for inhibiting use of the first frequency band. If a specific country where use of the first frequency band is not inhibited is confirmed by the user interface unit, the control unit 18 sets the availability/unavailability information for permitting use of the first frequency band.

In a step S1305, the control unit 18 sets the 5 GHz band wireless LAN use flag to ON and stores the value of the flag in the body-side storage device 14. Thus, in a case where a plurality of specific countries are confirmed by the user interface unit, the control unit 18 as the setting unit can make settings for enabling wireless communication using the mounted wireless LAN module 20, by using the acquired device destination setting information and 5 GHz band availability/unavailability information. Then, the control unit 18 terminates the present control.

In the step S1306, the control unit 18 displays an unavailability notifying screen indicating that the device destination is not correct and hence the wireless LAN cannot be used, on the display section 2a of the console panel 2.

In a step S1307, the control unit 18 sets the 5 GHz band wireless LAN use flag to OFF and stores the value of the flag in the body-side storage device 14. Then, the control unit 18 terminates the present control. Thus, in a case where the plurality of specific countries are not confirmed by the user interface unit, the control unit 18 as the setting unit can make settings for inhibiting wireless communication using the mounted wireless LAN module 20.

Figure 14A:
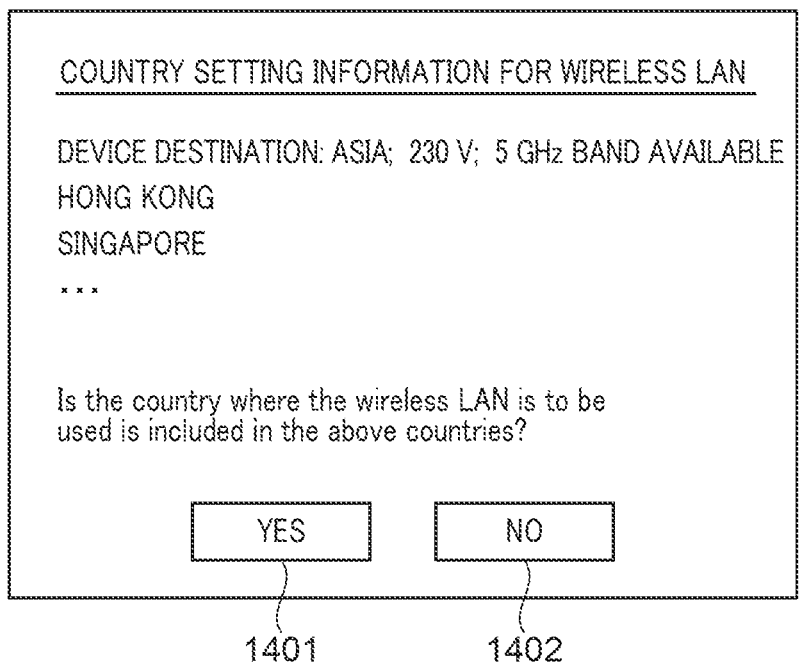
FIGS. 14A and 14B are diagrams useful in explaining a variety of screens displayed on the display section appearing in FIG. 3, in the second embodiment.
Figure 14B:
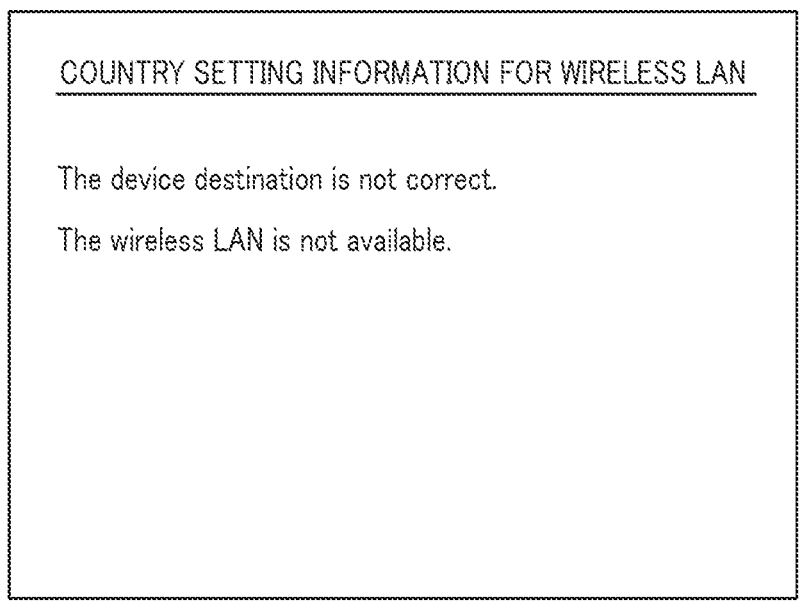

FIGS. 14A and 14B are diagrams useful in explaining a variety of screens displayed on the display section appearing in FIG. 3. FIG. 14A is a diagram useful in explaining the confirmation screen displayed on the display section 2a appearing in FIG. 3. The control unit 18 displays the confirmation screen shown in FIG. 14A on the display section 2a of the console panel 2 in the step S1302 in FIG. 13. The confirmation screen shown in FIG. 14A displays the concerned specific countries, based on the 5 GHz band availability/unavailability information acquired from the connected wireless LAN module 20 and the country names of the same device destination acquired from the body-side storage device 14. Further, the confirmation screen shown in FIG. 14A displays a confirmation button 1401 indicating "YES" and a confirmation button 1402 indicating "NO". If a country where the image forming apparatus 1 is being used is displayed on the confirmation screen shown in FIG. 14A, the service person or the like operates the confirmation button 1401 indicating "YES". In this case, the control unit 18 determines in the step S1303 that the user has operated the console panel 2 by judging that the device destination is correct, and proceeds to the step S1304. If a country where the image forming apparatus 1 is being used is not displayed on the confirmation screen shown in FIG. 14A, the service person or the like operates the confirmation button 1402 indicating "NO". In this case, the control unit 18 determines in the step S1303 that the user has operated the console panel 2 by judging that the device destination is not correct, and proceeds to the step S1306.

FIG. 14B is a diagram useful in explaining the unavailability notifying screen displayed on the display section 2a appearing in FIG. 3. The control unit 18 displays the unavailability notifying screen shown in FIG. 14B on the display section 2a of the console panel 2 in the step S1306 in FIG. 13. This enables the service person or the like to be aware that the wireless LAN module 20 cannot be used in the country where the image forming apparatus 1 is being used.

Figure 15:
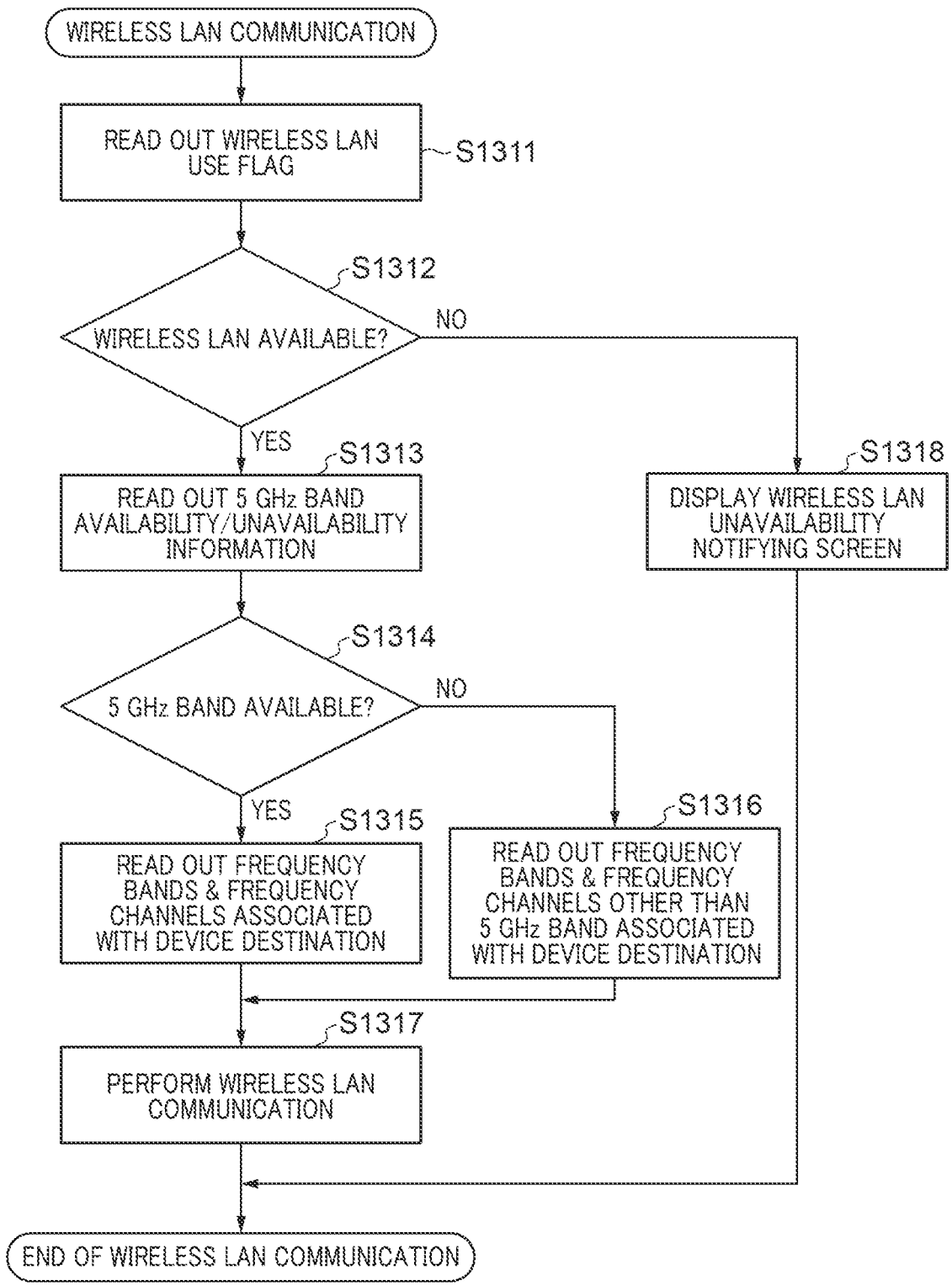
FIG. 15 is a flowchart of a wireless communication control process performed by the control unit appearing in FIG. 3 after the setting control process in FIG. 13 of the second embodiment.

FIG. 15 is a flowchart of a wireless communication control process performed by the control unit 18 appearing in FIG. 3 after the setting control process in FIG. 13. The control unit 18 of the image forming apparatus 1 as the communication execution unit repeatedly executes the wireless communication control in FIG. 15 in the step S45 in FIG. 12 when the image forming apparatus 1 is active, and executes wireless communication using the mounted wireless LAN module 20.

In a step S1311, the control unit 18 reads out the wireless LAN use flag from the body-side storage device 14. With this, the control unit 18 as the communication execution unit can acquire the settings set by the setting unit before executing wireless communication using the wireless LAN module 20.

In a step S1312, the control unit 18 judges the value of the wireless LAN use flag. If the wireless LAN use flag read out in the step S1311 is set to ON, the control unit 18 determines that the wireless LAN can be used, and proceeds to a step S1313. If the wireless LAN use flag read out in the step S1311 is set to OFF, the control unit 18 determines that the wireless LAN cannot be used, and proceeds to a step S1318.

In the step S1313, the control unit 18 reads out the 5 GHz band availability/unavailability information, which has already been stored in the body-side storage device 14 by a setting operation, from the body-side storage device 14.

In a step S1314, the control unit 18 judges the 5 GHz band availability/unavailability information read out in the step S1313. If the read information indicates "available", the control unit 18 proceeds to a step S1315. If the read information indicates "unavailable", the control unit 18 proceeds to a step S1316.

In the step S1315, since the 5 GHz band availability/unavailability information indicates "available" in the step S1314, the control unit 18 reads out the information on the availability/unavailability of the frequency bands and the frequency channels, which is stored in the body-side storage device 14. Here, the control unit 18 may output the read information of the availability/unavailability of the frequency bands and the frequency channels to the USB device controller 24 of the wireless LAN module 20 connected via the USB host controller 19 and the USB cable 3. In this case, the USB device controller 24 makes settings for performing wireless communication, for the wireless LAN baseband section 25 and the wireless LAN RF controller 26, based on the information on the frequency bands and the frequency channels, which is acquired from the control unit 18. After that, the control unit 18 proceeds to a step S1317.

In the step S1316, since the 5 GHz band availability/unavailability information indicates "unavailable" in the step S1314, the control unit 18 reads out only the frequency channels other than the 5 GHz band, out of the availability/unavailability information on the frequency bands and the frequency channels, which is stored in the body-side storage device 14. Here, the control unit 18 reads out the channels of the 2.4 GHz band. With this, even when a country where use of the 5 GHz is inhibited is grouped in the same device destination, the control unit 18 can properly set the frequency channels so as to prevent use of the 5 GHz band.

In the step S1317, the control unit 18 controls the wireless LAN baseband section 25 and the wireless LAN RF controller 26 via the USB device controller 24 of the connected wireless LAN module 20 to perform wireless communication. Here, the wireless LAN module 20 executes wireless communication using the available frequency bands and frequency channels based on the availability/unavailability information on the frequency bands and the frequency channels read out in the step S1315 or the step S1316. With this, the control unit 18 can execute wireless communication using the connected wireless LAN module 20 in a case where it is confirmed that the mounted wireless LAN module 20 can be used for wireless communication. After that, the control unit 18 terminates the present control.

In the step S1318, since the acquired wireless LAN use flag is set to OFF, the control unit 18 displays a screen notifying the user that the wireless LAN cannot be used, on the display section 2a of the console panel 2. For example, the control unit 18 may display the unavailability notifying screen shown in FIG. 14B on the display section 2a of the console panel 2. This enables the service person or the like to be aware that the wireless LAN module 20 cannot be used in the country where the image forming apparatus 1 is being used. After that, the control unit 18 terminates the present control. In this case, the control unit 18 terminates the present control without executing wireless communication.

As described above, in the present embodiment, the wireless LAN module 20 mounted on the image forming apparatus 1 is the one which can be used in a plurality of specific countries and stores the 5 GHz band availability/unavailability information in the OTP section 27. And, the image forming apparatus 1 acquires the 5 GHz band availability/unavailability information from the OTP section 27 of the mounted wireless LAN module 20. Further, the image forming apparatus 1 sets and stores the country names classified into the same device destination, and the 5 GHz band availability/unavailability information and the availability/unavailability information of the frequency channels of each country, in the body-side storage device 14. The image forming apparatus 1 makes settings for enabling wireless communication using the mounted wireless LAN module 20, by using the setting information set in the body-side storage device 14 based on the acquired 5 GHz band availability/unavailability information. With this, even when there is a country where use of the 5 GHz band is not approved among the countries classified into the same device destination, it is possible to make proper channel settings and realize wireless communication conformant to the radio laws of the countries.

In the above-described embodiment, in the step S802 after the wireless LAN module 20 is installed and the image forming apparatus is started up, the screen for confirming the country destination is displayed, and whether or not the country destination is correct is confirmed in the step S803. However, this confirmation is not required to be executed at the time of installation, insofar there is no doubt that the wireless LAN module 20 for the correct country destination is supplied as an option to each country. In this case, the control unit 18 of the image forming apparatus 1 may make settings, according to the country destination group number read in the step S801, for performing wireless communication in the frequency bands and the frequency channels associated with the country destination group number, without performing confirmation on whether the country destination is correct.

In the above-described embodiment, the country destination group number read in the step S801 is stored in the body-side storage device 14 in the step S805. Then, the control unit 18 reads out the country destination group number from the body-side storage device 14 afterwards in the step S813 and executes wireless communication in the frequency bands and the frequency channels associated with the country destination group number. Besides this, for example, when performing wireless communication, the control unit 18 may read out, on each occasion, the country destination group number from the OTP section 27 of the wireless LAN module 20 according to the procedure described in the step S801. In this case, the control unit 18 executes wireless communication in the frequency bands and the frequency channels associated with the country destination group number read out from the wireless LAN module 20.

In the above-described second embodiment, the availability/unavailability information of the 5 GHz of a plurality of countries and the group number of the group to which the plurality of countries belong are stored in the OTP section 27 of the wireless LAN module 20. Further, the control unit 18 sets and stores one wireless LAN use flag in the body-side storage device 14. Besides this, for example, the control unit 18 may set and store the wireless LAN use flag in the body-side storage device 14 for each frequency band, such as the first frequency band (5 GHz) and the second frequency band (2.4 GHz).

In this case, the control unit 18 is only required to set both of the wireless LAN use flag of the 5 GHz band and the wireless LAN use flag of the 2.4 GHz band to ON in the setting control process in FIG. 8. Further, the control unit 18 is only required to rewrite only the wireless LAN use flag of the 5 GHz band by performing the setting control process in FIG. 13. The wireless LAN use flag of the 2.4 GHz band is not changed from the value set by the setting control process in FIG. 8. In a case where the wireless LAN use flag of the 2.4 GHz band is set to ON in the setting control process in FIG. 8, the value remains set to ON. In a case where the wireless LAN use flag of the 2.4 GHz band is set to OFF in the setting control process in FIG. 8, the value remains set to OFF.

Further, the control unit 18 determines the wireless LAN use flag in the step S1312. In the determination of a plurality of wireless LAN use flags, in a case where a flag set to ON is included in the plurality of wireless LAN use flags read in the step S1311, the control unit 18 may determine that the wireless LAN can be used and proceed to the step S1313. Further, in a case where the plurality of wireless LAN use flags read in the step S1311 are all set to OFF, i.e. a flag set to ON is not included, the control unit 18 may determine that the wireless LAN cannot be used and proceed to the step S1318.

Also in this variation, the OTP section 27 of the wireless LAN module 20 can store not only the group identification information indicative of a plurality of specific countries, but also the information indicating with respect to each specific country whether or not the first frequency band is available. Further, the control unit 18 as the setting unit can acquire the availability/unavailability information indicating with respect to a specific country confirmed by the user interface unit whether or not the first frequency band is available, from the OTP section 27 of the wireless LAN module 20, and set the acquired information.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-016697, filed Feb. 4, 2021, and Japanese Patent Application No. 2021-188688, filed Nov. 19, 2021, which are hereby incorporated by reference herein in their entirety.

What is claimed is:

1. An information processing apparatus on which a wireless communication module, which can be used in a plurality of specific countries and stores group identification information indicative of the plurality of specific countries in a storage of the wireless communication module, can be mounted, the information processing apparatus comprising:
    a display; and
    a controller,
    wherein the controller acquires the group identification information from the storage of the wireless communication module,
    wherein the controller causes the display to display a confirmation screen for confirming whether a country where the information processing apparatus is to be used is included in a group identified by the acquired group identification information,
    wherein, in a case where the controller receives an operation indicating that the country where the information processing apparatus is to be used is not included in the group, the controller prohibits the wireless communication module from performing a communication, and
    wherein, in a case where the controller receives an operation indicating that the country where the information processing apparatus is to be used is included in the group, the controller permits the wireless communication module to perform a communication, the communication being performed using a frequency corresponding to the acquired group identification information.

2. The information processing apparatus according to claim 1,
    wherein, in the case where the controller receives the operation indicating that the country is not included in the group, the controller prohibits the wireless communication module from performing the communication and the causes the display to display a message indicating that the wireless communication module is not available.

3. The information processing apparatus according to claim 1, wherein one or more country names included in the group are displayed in the confirmation screen.

4. The information processing apparatus according to claim 1,
wherein the controller causes the display to display the confirmation screen each time the information processing apparatus is reset.

5. The information processing apparatus according to claim 1, further comprising a printer that prints an image on a sheet.

6. A method for controlling an information processing apparatus on which a wireless communication module, which can be used in a plurality of specific countries and stores group identification information indicative of the plurality of specific countries in a storage of the wireless communication module, can be mounted, the method comprising:
acquiring the group identification information from the storage of the wireless communication module;
causing a display of the information processing apparatus to display a confirmation screen for confirming whether a country where the information processing apparatus is to be used is included in a group identified by the acquired group identification information;
prohibiting the wireless communication module from performing a communication in a case where an operation indicating that the country where the information processing apparatus is to be used is not included in the group is received; and
permitting the wireless communication module to perform a communication, the communication being performed using a frequency corresponding to the acquired group identification information, in a case where an operation indicating that the country where the information processing apparatus is to be used is included in the group is received.

7. A non-transitory computer readable storage medium storing a program causing an information processing apparatus to perform a method for controlling the information processing apparatus on which a wireless communication module, which can be used in a plurality of specific countries and stores group identification information indicative of the plurality of specific countries in a storage of the wireless communication module, can be mounted, the method comprising:
acquiring the group identification information from the storage of the wireless communication module;
causing a display of the information processing apparatus to display a confirmation screen for confirming whether a country where the information processing apparatus is to be used is included in a group identified by the acquired group identification information;
prohibiting the wireless communication module from performing a communication in a case where an operation indicating that the country where the information processing apparatus is to be used is not included in the group is received; and
permitting the wireless communication module to perform a communication, the communication being performed using a frequency corresponding to the acquired group identification information, in a case where an operation indicating that the country where the information processing apparatus is to be used is included in the group is received.

* * * * *